United States Patent
Chen et al.

(10) Patent No.: US 11,841,845 B2
(45) Date of Patent: Dec. 12, 2023

(54) DATA CONSISTENCY MECHANISM FOR HYBRID DATA PROCESSING

(71) Applicant: LEMON INC., Grand Cayman (KY)

(72) Inventors: Jianjun Chen, Los Angeles, CA (US);
Yonghua Ding, Los Angeles, CA (US);
Ye Liu, Los Angeles, CA (US);
Fangshi Li, Los Angeles, CA (US);
Lixun Cao, Beijing (CN); Yang Liu,
Beijing (CN); Li Zhang, Los Angeles,
CA (US); Mingyi Zhang, Los Angeles,
CA (US); Xiangrui Meng, Beijing
(CN); Junda Zhao, Beijing (CN); **Lei
Zhang, Beijing (CN); Rui Shi**, Beijing
(CN)

(73) Assignee: LEMON INC., Grand Cayman (KY)

( * ) Notice: Subject to any disclaimer, the term of this patent is extended or adjusted under 35 U.S.C. 154(b) by 151 days.

(21) Appl. No.: 17/462,938

(22) Filed: Aug. 31, 2021

(65) Prior Publication Data

US 2023/0062198 A1 Mar. 2, 2023

(51) Int. Cl.
*G06F 16/23* (2019.01)
*G06F 16/27* (2019.01)
*G06F 16/28* (2019.01)

(52) U.S. Cl.
CPC ...... *G06F 16/2365* (2019.01); *G06F 16/2358* (2019.01); *G06F 16/278* (2019.01); *G06F 16/283* (2019.01)

(58) Field of Classification Search
None
See application file for complete search history.

(56) References Cited

U.S. PATENT DOCUMENTS

| 7,620,660 B2 * | 11/2009 | Kodavalla | G06F 11/1471 |
| 10,002,175 B2 * | 6/2018 | Kemper | G06F 16/28 |
| 2011/0178984 A1 | 7/2011 | Talius et al. | |

(Continued)

FOREIGN PATENT DOCUMENTS

| CN | 111858759 A | 10/2020 |
| CN | 112363873 A | 2/2021 |
| CN | 111858759 B | 6/2021 |

OTHER PUBLICATIONS

Kolodner, Elliot & William Weihl, "Atomic Incremental Garbage Collection and Recovery for a Large Stable Heap", ACM SIGMOD Rec. 22, 2 (Jun. 1, 1993), pp. 177-186. (Year: 1993).*

(Continued)

*Primary Examiner* — Scott A. Waldron
(74) *Attorney, Agent, or Firm* — BakerHostetler

(57) ABSTRACT

The present disclosure describes techniques of providing data consistency for hybrid transactional and analytical processing. Logical logs and log serial numbers (LSNs) associated with the logical logs may be generated based on data captured by a first processing engine. The logical logs and the LSNs may be propagated to a storage subsystem configured to be in communication with the first processing engine and a second processing engine. The LSNs and information indicative of LSN schema versions may be stored and distributed by a metadata service. The first processing engine, the second processing engine, the storage subsystem and the metadata service are modularized, and support a LSN mechanism for maintaining data consistency.

20 Claims, 11 Drawing Sheets

(56) References Cited

U.S. PATENT DOCUMENTS

| | | | |
|---|---|---|---|
| 2013/0073513 | A1 | 3/2013 | Kemper et al. |
| 2014/0052743 | A1 | 2/2014 | Schauer et al. |
| 2014/0279900 | A1 | 9/2014 | Gupta et al. |
| 2016/0103877 | A1 | 4/2016 | Ozcan et al. |
| 2016/0224253 | A1 | 8/2016 | Tuers et al. |
| 2016/0248866 | A1 | 8/2016 | Garas |
| 2017/0011012 | A1 | 1/2017 | Das et al. |
| 2017/0366624 | A1* | 12/2017 | Tsang ............... H04L 41/12 |
| 2018/0150490 | A1 | 5/2018 | Lipcon |
| 2018/0196694 | A1 | 7/2018 | Banerjee et al. |
| 2019/0325055 | A1 | 10/2019 | Lee et al. |
| 2021/0081403 | A1 | 3/2021 | Tian |
| 2021/0357407 | A1 | 11/2021 | Bok et al. |
| 2021/0365469 | A1 | 11/2021 | Brunswig et al. |

OTHER PUBLICATIONS

Muhlbauer, Tobias, et al., "ScyPer: Elastic OLAP Throughput on Transactional Data", In Proceedings of the Second Workshop on Data Analytics in the Cloud (DanaC '13), pp. 11-15. (Year: 2013).*

Ahn, Jung-Sang, et al., "Designing an Efficient Replicated Log Store with Consensus Protocol", In Proceedings of the 11th USENIX Conference on Hot Topics in Cloud Computing (HotCloud'19), 7 pages. (Year: 2019).*

Chen, Jianjun, et al., "ByteHTAP: ByteDance's HTAP System with High Data Freshness and Strong Data Consistency", Proc. VLDB Endow. vol. 15, No. 12 (Aug. 2022), pp. 3411-3424. (Year: 2022).*

International Patent Application No. PCT/SG2022/050540; Int'l Search Report; dated Mar. 12, 2023; 5 pages.

Huang et al.; "TiDB: A Raftbased HTAP Database"; Proceedings of the VLDB Endowment; vol. 13 No. 12; Sep. 2020; p. 3072-3084.

Lee et al.; "SAP HANA Distributed In-Memory Database System: Transaction, Session, and Metadata Management"; $29^{th}$ IEEE Int'l Conf. on Data Engineering; Dec. 2013; 9 pages.

Lee et al.; "Parallel Replication across Formats in SAP HANA for Scaling Out Mixed OLTP/OLAP Workloads"; Proceedings of the VLDB Endowment; vol. 10 No. 12; Aug. 2017; p. 1598-1609.

International Patent Application No. PCT/SG2022/050550; Int'l Search Report; dated Apr. 24, 2023; 3 pages.

Lang et al.; "Data Blocks: Hybrid OLTP and OLAP on Compressed Storage using both Vectorization and Compilation"; Int'l Conf. on Management of Data SIGMOD; 2016; p. 311-326.

International Patent Application No. PCT/SG2022/050549; Int'l Search Report; dated Mar. 13, 2023; 5 pages.

* cited by examiner

Generating logical logs and log serial numbers (LSNs) associated with the logical logs based on data captured by a first processing engine, the first processing engine configured to perform online transactional processing (OLTP) 802

Propagating the logical logs and the LSNs to a storage, the storage configured to in communication with the first processing engine and a second processing engine, the second processing engine configured to perform online analytical processing (OLAP) 804

Storing and distributing the LSNs and information indicative of LSN schema versions by a metadata service, wherein the first processing engine, the second processing engine, the storage, and the metadata service are modularized and support a LSN mechanism for maintaining data consistency 806

FIG. 8

DATA CONSISTENCY MECHANISM FOR HYBRID DATA PROCESSING

BACKGROUND

Data processing refers to the process of performing specific operations on a set of data or a database. A database is an organized collection of facts and information, such as records on inventory, customers, and so on. Numerous forms of data processing exist and serve diverse applications in the business setting. As databases are increasingly used to store large amounts of complex data, improvements in data processing techniques may be desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 8 shows an example process for ensuring strong data consistency in a hybrid transactional and analytical processing system.

DETAILED DESCRIPTION OF ILLUSTRATIVE EMBODIMENTS

Figure 1:
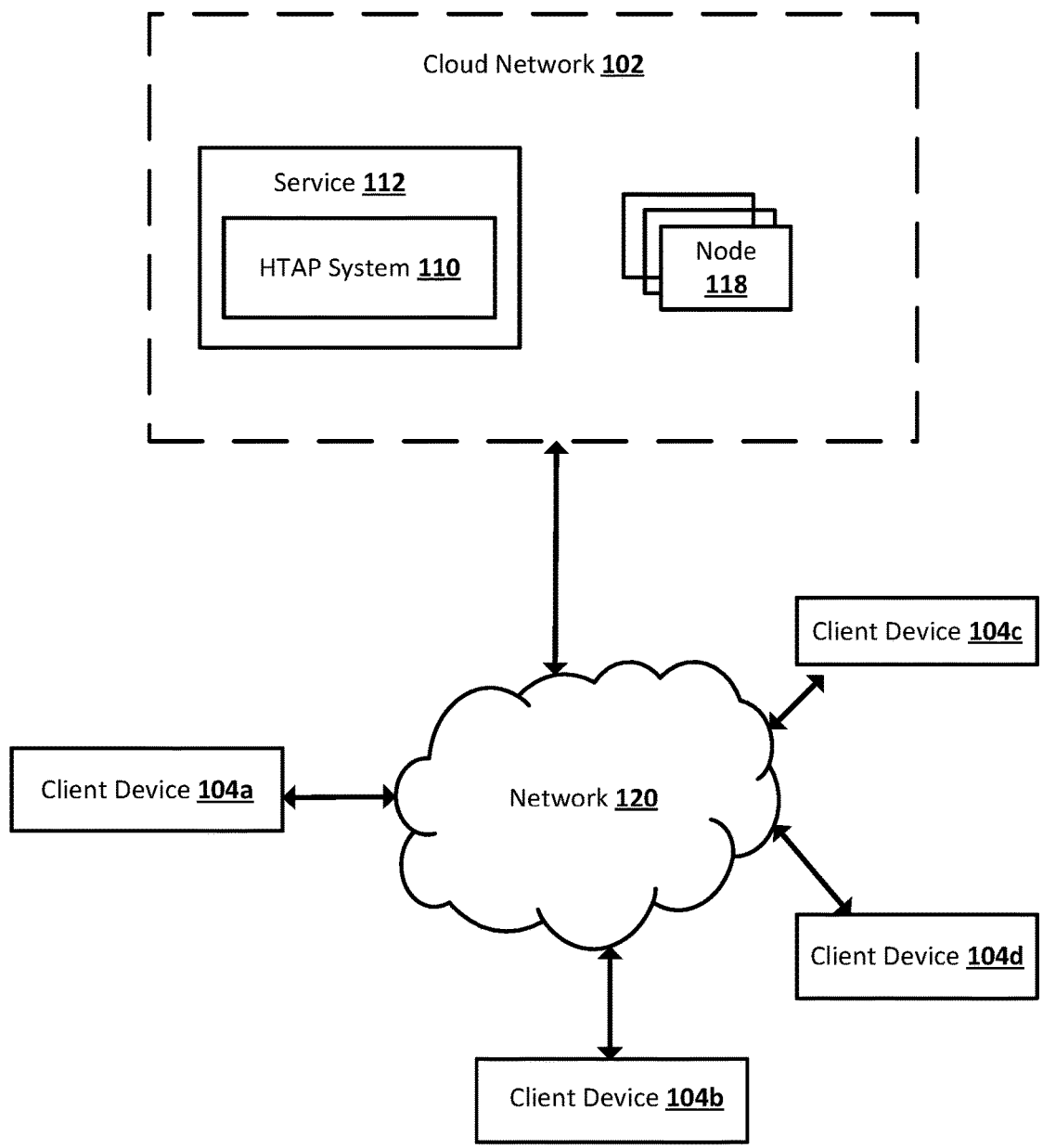
FIG. 1 shows an example system including a cloud service.

Online analytical processing (OLAP) systems enable users to analyze multidimensional data interactively from multiple perspectives. Multidimensional data includes data sets with three or more dimensions. OLAP systems allow users to analyze information from multiple database systems at the same time. OLAP systems enables analysts to extract and view data, such as business data, from different points of view. Analysts frequently need to group, aggregate, and join data. These OLAP operations in data mining are resource intensive. With OLAP, data can be pre-calculated and pre-aggregated, making analysis faster. However, traditionally OLAP systems typically bulk load large amounts of data periodically. This may cause OLAP systems to suffer from the problem of stale data.

OLAP is typically contrasted to OLTP (online transaction processing) systems. OLTP systems capture, store, and process data from transactions. OLTP systems are generally characterized by less complex queries, in a larger volume, to process transactions rather than for the purpose of business intelligence or reporting. Traditional OLTP systems are able to support data manipulation language (DML). DML is a computer programming language used for adding (inserting), deleting, and modifying (updating) data in a database. Traditional OLTP systems may also be able to support point look-up queries efficiently.

Noticeable differences exist between OLAP systems and OLTP systems. For example, OLTP systems typically do not have massive parallel query engines (such as those present in OLAP systems) to support efficient complex query processing over large amount of data. As another example, OLAP systems are mostly optimized for read only and may not support other kinds of queries, whereas OLTP systems process all kinds of queries (read, insert, update, and delete). As yet another example, OLTP systems are associated with short atomic transactions, whereas OLAP systems allow for more flexible distribution patterns and higher scalability, but with increased latency and without guaranteed upper bound to processing time.

Many prevailing data platforms/systems focus on only one of these workloads (e.g., either OLAP or OLTP). However, many scenarios (e.g., business scenarios) require both the performance of complex OLAP-like analysis over freshly imported data and the transaction support and strong data consistencies offered by OLTP systems. Hybrid transaction/analytical processing (HTAP) systems are most suitable for such scenarios.

HTAP systems offers several unique advantages. In a HTAP system, OLAP and OLTP workloads are united within a single system. By uniting OLAP and OLTP workloads within a single system, the complexity and cost for deployment and maintenance are significantly reduced. Such a versatile system can significantly reduce staleness in the query results (such staleness is usually introduced by the time-consuming and costly ETL process from operational databases to data warehouses). Such a system also has the capability for complex analysis over real-time data, thus addressing modern business models that usually require an effective response to transient opportunities that must be exploited in real-time.

However, many existing HTAP systems have downsides. Many existing products build HTAP systems by merely gluing OLTP and OLAP systems together. For example, many existing products build HTAP systems by merely gluing OLTP and OLAP systems together using ETL technologies to load data from OLTP storage to OLAP storage. By merely gluing OLTP and OLAP systems together, the HTAP system lacks desirable features, such as strong data consistency across the OLTP and OLAP components of the HTAP system. Strong data consistency across the OLTP and OLAP components of the HTAP system is critical to many business scenarios. Accordingly, a HTAP system that addresses these shortcomings is desirable.

A HTAP system that has strong data consistency across the OLTP and OLAP components of the HTAP system is described herein. Unlike existing HTAP systems, the HTAP system described herein is configured to provide a global snapshot isolation across OLTP and OLAP components and is configured to support OLAP queries to read latest updates in the current system—thus ensuring strong data consistency. The global snapshot isolation across OLTP and OLAP components may be provided, for example, using mechanisms including, but not limited to, the Quorum and Gossip protocol, and Log Sequence Numbers (LSNs). Utilizing such mechanism, all queries in the HTAP system are provided with access to a consistent snapshot of dataset. No dirty, corrupt, and/or outdated data may be provided to users. In some embodiments, users of the HTAP system described herein may be provided with a flexible interface to choose a desired data consistency level.

The HTAP system having strong data consistency across the OLTP and OLAP components may feature a flexible modularized design. The modularized HTAP system may be composed of several decouplable major components: an OLTP engine, an OLAP engine, a decoupled storage serving both the OLTP and OLAP engine, a metadata service, and a smart proxy. The decoupled storage component may comprise an OLTP row store and an OLAP store having two parts: an in-memory delta store holding latest updates, and an on-disk base store holding large blocks of data. Data from the delta store may be periodically flushed to the base store as new data blocks. The LSN mechanism utilized by the HTAP system to ensure strong data consistency may be a shared effort across all these decouplable components, while not being coupled with any specific components. Each component may be un-plugged and replaced with a replacement component, so long as that replacement component is configured extend support for LSNs through public APIs.

An HTAP system, such as the improved HTAP system described above, may be utilized by a variety of different systems or entities. FIG. 1 illustrates an example system 100 that includes an HTAP system. The system 100 may comprise a cloud network 102 and a plurality of client devices 104a-d. The cloud network 102 and the plurality of client devices 104a-d may communicate with each other via one or more networks 120.

The cloud network 102 may be located at a data center, such as a single premise, or be distributed throughout different geographic locations (e.g., at several premises). The cloud network 102 may provide service(s) via the one or more networks 120. The network 120 comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a service 112. The service 112 may comprise a content streaming service, such as an Internet protocol video streaming service. The service 112 may be configured to distribute content via a variety of transmission techniques. The service 112 is configured to provide the content, such as video, audio, textual data, a combination thereof, and/or the like. The content may comprise content streams (e.g., video stream, audio stream, information stream), content files (e.g., video file, audio file, text file), and/or other data. The content may be stored in a database. For example, the service 112 may comprise a video sharing service, a video hosting platform, a content distribution platform, a collaborative gaming platform, and/or the like. The service 112 may comprise any other type of service in addition to, or instead of, a content streaming service.

In an embodiment, the service 112 may be provided to the client devices 104 via the network 120. If the service 112 is a content streaming service, content may be output to different client devices 104 via the network 120. The content may be streamed to the client devices 104. The content stream may be a stream of short videos received from the service 112. The plurality of client devices 104 may be configured to access the content from the service 112. In an embodiment, a client device 104 may comprise an application. The application outputs (e.g., display, render, present) the content to a user associated with the client device 104. The content may comprise videos, audio, comments, textual data and/or the like.

In an embodiment, a user may use the application on a client device 104 to create content and upload the short video to the cloud network 102. The client devices 104 may access an interface of the application. The interface may comprise an input element. For example, the input element may be configured to allow users to create the content. To create the content, the user may give the application permission to access an image capture device, such as a camera, or a microphone of the client device 104. After the user has created the content, the user may use the application to upload the content to the cloud network 102 and/or to save the content locally to the user device 104. The service 112 may store the uploaded content and any metadata associated with the content in one or more databases.

The plurality of client devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access the cloud network 102. The plurality of client devices 104 may travel to a variety of locations and use different networks to access the cloud network 102.

The plurality of computing nodes 118 may process tasks associated with the service 112. The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In an embodiment, the service 112 comprises an HTAP system 110. The HTAP system 110 may comprise a plurality of different components (e.g., subsystems). For example, the HTAP system 110 may comprise one or more of a transactional OLTP engine, an analytic OLAP engine, an underlying decoupled storage, a metadata service, and/or a smart proxy. The architecture of the HTAP system 110 is discussed in more detail below with regards to FIGS. 3a-7. Additional details about each of the subsystems are also discussed in more detail below with regards to FIGS. 3a-7.

The HTAP system 110 may have an architecture that supports heterogeneous query engines. The architecture may have the capability to handle both transactional OLTP workloads and complex analytic (OLAP) workloads. The architecture may follow a modularized design and its major components may be fully decoupled, providing flexibility and easy scaling out. For example, the components of the HTAP system 110 may be easily changed to similar established subsystems. The architecture may eliminate the interference between OLTP and OLAP workloads by having separate query processing engines and with different data copies.

The HTAP system 110 may keep user data in different formats for the OLTP engine and the OLAP engine. For example, the HTAP system 110 may keep user data in row format for the OLTP engine and columnar format for the OLAP engine for efficient query processing. The architecture may have a single point truth of metadata and may use a standalone metadata service to provide the latest metadata to certain components of the HTAP system 110. The architecture of the HTAP system 110 may include a smart proxy that dispatches queries to the OLTP and OLAP subsystems based on the nature of the queries (and therefore can hide the internal details to the users/clients). Users/clients may be able to utilize the HTAP system 110 with a single unified interface. For example, users/clients may be able to utilize the HTAP system 110 with an interface of a client device 104. The architecture may support various kinds of APIs (e.g., ANSI SQL, JDBC, ODBC, etc.) based on user requirements.

The architecture of the HTAP system 110 may be able to handle a large scale of data. This is a result of the fact that the compute and storage components in the HTAP system 110 may be decoupled. A decoupled storage system that is able to persist large amounts of data us utilized, as it is not assumed that data will be able to fit in memory. Computation resources and storage resources in the HTAP system 110 may also be scaled out and are therefore capable of handling large amounts of data and large scale (OLTP and OLAP) workloads with flexibility.

The architecture of the HTAP system 110 may be capable of effective and real-time data processing. DML queries may be handled effectively by the OLTP engine and effectively written to the underlying storage in row format. The architecture of the HTAP system 110 may include a OLAP query engine that has the ability of distributed query processing (high parallelism, better resource utilization) to effectively handle complex OLAP queries, including joins, aggregates, etc. Effective and real-time processing is empowered by the fact that interference between OLTP and OLAP workloads is minimized, as the architecture of the HTAP system 110 facilities the storage of distinct copies of data on both the OLTP and OLAP sides. The OLTP and OLAP data formats may be separately optimized to fit their workloads. There may be a single source of data change through the HTAP system 110 (from the OLTP side), simplifying the consistency model and concurrency handling across the OLTP and OLAP components.

The architecture of the HTAP system 110 may provide fresh/real-time data changes for OLAP queries. Logical logs of DMLs may be immediately propagated from the OLTP component to the OLAP component upon commit. These logs may be dispatched to distributed partitions and may be continuously applied to in-memory Delta Stores via in-memory operations, which are usually very fast. Data changes carried by logical logs may be immediately available for OLAP queries upon being applied to in-memory Delta Stores. A unified version control across the HTAP system 110 is utilized by the architecture of the HTAP system 110 so that strong data consistency is guaranteed. The OLTP component of the HTAP system 110 may support snapshot isolation and other (weaker) consistency models as most of transactional OLTP database engines.

Figure 2:
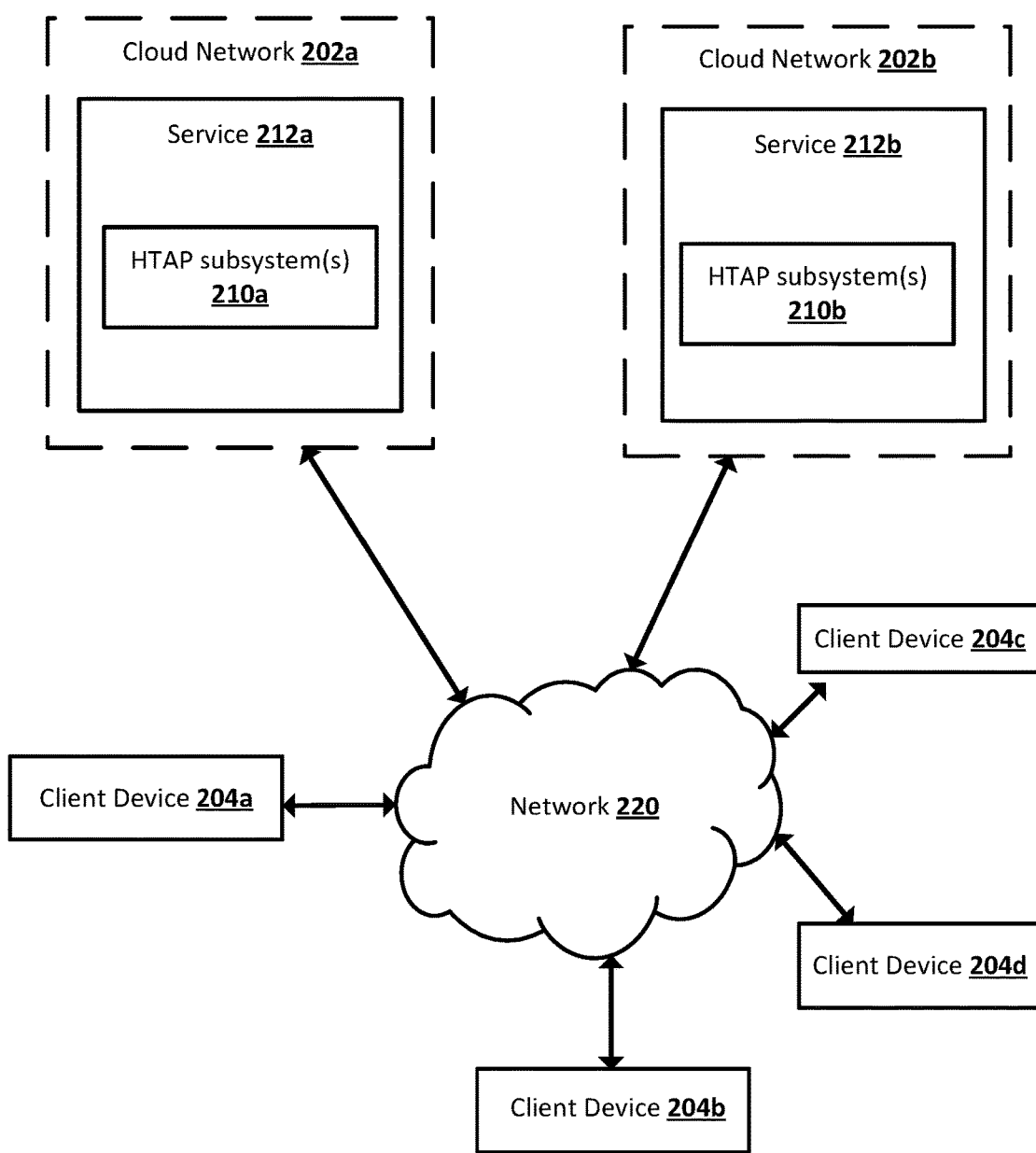
FIG. 2 shows an example system including more than one cloud service.

While the system 100 of FIG. 1 illustrates the HTAP system 110 as being provided by a single cloud network 102, the various components/subsystems of the HTAP system 110 may instead be provided by a plurality of different cloud networks. FIG. 2 illustrates an example system 200 that includes an HTAP system having components/subsystems across a plurality of cloud networks. The system 200 may comprise cloud networks 202a-b and a plurality of client devices 204a-d. The cloud networks 202a-b and the plurality of client devices 204a-d may communicate with each other via one or more networks 220.

Each of the cloud networks 202a-b may resemble the cloud network 102 described above in FIG. 1. Each of the cloud networks 202a-b may be located at a data center, such as a single premise, or be distributed throughout different geographic locations (e.g., at several premises). The cloud networks 202a-b may provide service(s) via the one or more networks 220. The cloud networks 202a-b comprise a variety of network devices, such as routers, switches, multiplexers, hubs, modems, bridges, repeaters, firewalls, proxy devices, and/or the like. The cloud networks 202a-b may comprise physical links, such as coaxial cable links, twisted pair cable links, fiber optic links, a combination thereof, and/or the like. The cloud networks 202a-b may comprise wireless links, such as cellular links, satellite links, Wi-Fi links and/or the like.

Each of the cloud networks 202a-b may comprise a plurality of computing nodes that host a variety of services. In an embodiment, the nodes associated with the cloud network 202a host a service 212a and the nodes associated with the cloud network 202b host a service 212b. The services 212a-b may comprise any type of service, such as the content streaming service described above with respect to FIG. 1.

The plurality of client devices 204 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access at least one of the cloud networks 202a-b. The plurality of client devices 104 may travel to a variety of locations and use different networks to access the cloud networks 202a-b.

In an embodiment, each of the services 212a-b comprise one or more components/subsystems of an HTAP system (e.g., the HTAP system 110). The HTAP system 110 may comprise a plurality of different components (e.g., subsystems). For example, the HTAP system may comprise one or more of a transactional OLTP engine, an analytic OLAP engine, an underlying decoupled storage, a metadata service, and/or a smart proxy. The service 212a may comprise one or more of (but not all of) the components of the HTAP system. The service 212b may comprise the remainder of the components of the HTAP system. While two cloud networks and their respective services are shown in FIG. 2, it should be appreciated that any number of cloud networks/services may be utilized to implement the herein described HTAP system.

Figure 3:
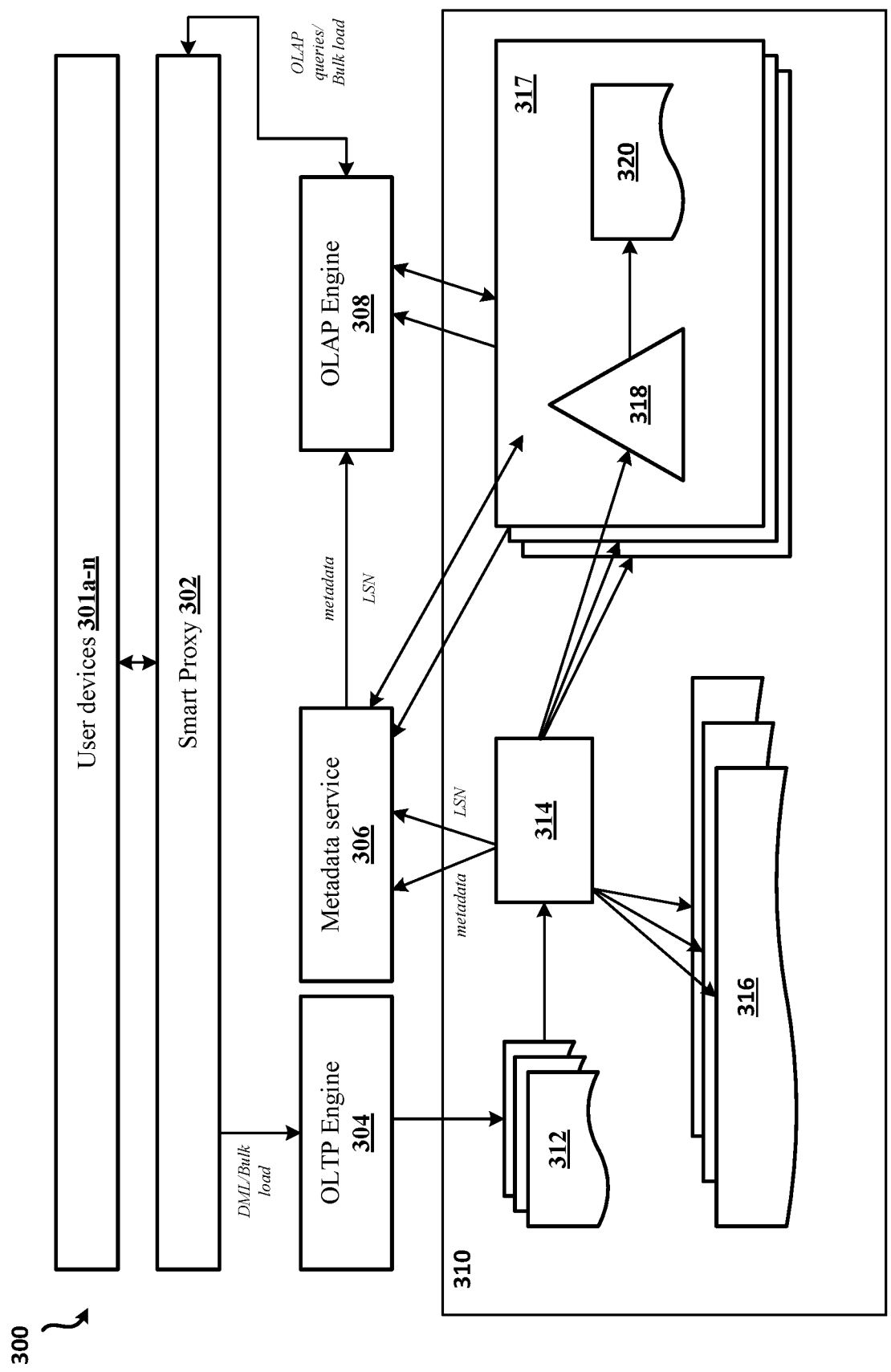
FIG. 3 shows an example system for hybrid transactional and analytical processing.

FIG. 3 shows an exemplary architecture 300 for a HTAP system (e.g, HTAP system 110) in accordance with the present disclosure. The architecture 300 comprises a plurality of different components (e.g., subsystems). The subsystems include an OLTP engine 304, an OLAP engine 308, a data storage system 310, a metadata service 306, and/or a proxy 302.

As described above, the OLTP engine 304 may receive user data, such as from the user devices 301a-n. The OLTP engine 304 may utilize a model that separates the compute engine from the underlying shared/cloud storage (AWS Aurora-like). The OLTP engine 304 may provide functionalities such as ACID transactional support, row storage, write-ahead logs (WAL) and log replication. The OLTP engine 304, for example, may capture the user data in real-time or near real-time.

The OLTP engine 304 may be configured to store and/or process at least some of the received user data in a particular format (e.g., row-based format). For example, upon receiving an OLTP query, the OLTP engine 304 may be configured to process at least some of the received user data in response to the query. An OLTP query may include, by way of example and without limitation, a query to retrieve a particular data item, query to filter the received data to look for a particular data item/description of a data item, and/or a query to filter the received data to identify a particular subset of the received data. For example, the queries may be DML queries and/or point look up queries.

The OLTP engine 304 may be configured to be coupled to and/or decoupled from the larger HTAP system 300. If the OLTP engine 304 is decoupled from the larger HTAP system 300, the OLTP engine 304 may be replaced with a substitute OLTP engine (e.g., a similar established OLTP engine). For example, the OLTP engine 304 may be replaced with a substitute OLTP engine that is configured to extend support for LSNs through public APIs. For example, the OLTP engine 304 may be MySQL, but it can be easily swapped to any other established OLTP engine, such as PostgreSQL.

The user devices 301a-n may comprise any type of computing device, such as a mobile device, a tablet device, laptop, a desktop computer, a smart television, or other smart device (e.g., smart watch, smart speaker, smart glasses, smart helmet), a gaming device, a set top box, digital streaming device, robot, and/or the like. The user devices 301a-n may be associated with one or more users. A single user may use one or more of the user devices 301a-n to access a cloud network that comprises the OLTP engine 304. The user devices 301a-n may travel to a variety of locations and use different networks to access the cloud network comprising the OLTP engine 304.

As also described above, the OLAP engine 308 may receive data captured by an OLTP engine, such as the OLTP engine 304. The data received by the OLAP engine 308 may be in a particular format (e.g., a hybrid row+column format) that is readable by the OLAP engine 308. The OLAP engine 308 may perform analysis on at least one portion of the data in the particular format in response to receiving an OLAP query.

For example, the OLAP engine 308 may perform an analytical operation on at least one portion of the data. OLAP consists of three basic analytical operations: consolidation (roll-up), drill-down, and slicing and dicing. Consolidation involves the aggregation of data that can be accumulated and computed in one or more dimensions. For example, all sales offices are rolled up to the sales department or sales division to anticipate sales trends. By contrast, the drill-down is a technique that allows users to navigate through the details. For instance, users can view the sales by individual products that make up a region's sales. Slicing and dicing is a feature whereby users can take out (slicing) a specific set of data of the OLAP cube and view (dicing) the slices from different viewpoints. These viewpoints are sometimes called dimensions (such as looking at the same sales by salesperson, or by date, or by customer, or by product, or by region, etc.). The results of the processing may be sent or forwarded to client devices 301.

The OLAP engine 308 may be any OLAP engine that is capable of handling complex analytic queries effectively, such as an established open-source query engine (e.g., FlinkSQL). The OLAP engine 308 may be configured to be coupled to and/or decoupled from the larger HTAP system 300. If the OLAP engine 308 is decoupled from the larger HTAP system 300, the OLAP engine 308 may be replaced with a substitute OLAP engine (e.g., a similar established OLAP engine). For example, the OLAP engine 308 may be replaced with a substitute OLAP engine that is configured to extend support for LSNs through public APIs. For example, the OLAP engine 308 may be FlinkSQL, but it can be easily swapped to any other established OLAP engine, such as Presto or Spark SQL.

The storage subsystem 310 may be decoupled from the OLTP engine 304 and the OLAP engine 308. As also described above, the data storage system 310 may persist user data in one format (e.g., row format) to be consumed by an OLTP engine, such as the OLTP engine 304, while persisting the same user data in a different format (e.g., hybrid row+column format) to be consumed by an OLAP engine, such as the OLAP engine 308. This may significantly reduce the interference between the OLAP and OLTP workloads. A plurality of data replicas (e.g., three data replicas) may be kept for both formats of data for high availability.

The data storage system 310 may function as a unified storage layer. However, the architecture of the data storage system 310, may be divided into two parts: the TP part and the AP part. Transactional DML and DDL received by the OLTP engine may be presented as physical/redo logs (with the information of underlying storage) and logical logs in a log store 312. These logs may be persisted in the TP part of the storage. The physical logs may then be replicated and distributed by a log distributor 314 to other storages and replayed to construct data pages. Data in the pages may be organized in row format and stored in a row data store 316. The data stored in the row data store 316 may be used by the OLTP engine for simple queries including point-lookup queries. The logical logs may also be replicated and distributed by the log distributor 314 to the AP part of the storage.

Each user table in the AP part of storage may be partitioned based on partitioning scheme defined on table creation. Each partition 317 may be resident in a physical storage node (e.g., server) and several replicas of the data may be maintained for high availability. Each partition 317 may be further divided into an in-memory delta store 318 and an on-disk base store 320. Logical logs (such as MySQL Binary Logs) for committed DML transactions may be continuously dispatched from the OLTP engine to user table partitions on each AP storage nodes. As an example, an update may be modeled with a delete followed by an insert. As a result, in the logical logs, there may be only inserts and deletes, but no updates.

Logical logs arrived at each AP storage nodes may be sorted, persisted, and then applied in order into the in-memory delta store 318 of each partition 317. Delta store 318 may store data in row format that is ordered by their log serial number (LSN, a serial number/version that indicates the order of the data operations). Data inside delta store 318 may be flushed to base store 320 in regular bases, for example, when its size grows over some predefined threshold or after some fixed time interval. After the flush, memory occupied by the flushed data may be garbage collected.

Data in base store 320 may be organized in columnar format for better performance of analytic workloads and persisted in local file systems (with current implementation. However, it should be appreciated that the architecture works with any underlying storage method. Data in base store 320 may not be able to be updated in-place, so a delete bitmap that marks the rows that are deleted may be maintained. With more and more deletions and overlapping flushed data units, compacting, and rearranging the data inside may benefit storage and potentially query performance, thus AP data units and clean up redundant data may be compacted on a regular basis. Files in base store 320 may be versioned, which is the largest LSNs in a file when it is flushed. LSNs may not be kept in the base store 320, which may result in all files in the base store 320 having the same version (i.e., the last flush LSN). This may provide many advantages. For example, it may save storage space, make delete more efficient by using the delete bitmap, and make scan faster without the need to compare with LSNs.

The storage subsystem 310 may be configured to be coupled to and/or decoupled from the larger HTAP system 300 as shown FIG. 3. If the storage subsystem 310 is decoupled from the larger HTAP system 300, the storage subsystem 310 may be replaced with a substitute storage subsystem (e.g., a similar established storage subsystem). For example, the storage subsystem 310 may be replaced with a substitute storage subsystem that is configured to extend support for LSNs through public APIs.

The metadata service 306 may be configured to align the metadata of the OLTP engine 304 and the OLAP engine 308. The metadata service 306 may extract metadata from events (e.g., DDLs) generated by certain resources (e.g., user input through the OLTP engine 308), generate metadata versions and align them with the order of DMLs, make them globally available and persist them. The metadata service 306 may generate replicas of the metadata versions for high availability. The metadata service 306 may extract metadata from DDLs received by the OLTP engine (with versions aligned by the same LSN system used for DMLs), persisted into a dedicated database and pushed to/pulled by FlinkSQL and AP storage servers.

The metadata service 306 may be configured to be coupled to and/or decoupled from the larger HTAP system 300. If the metadata service 306 is decoupled from the larger HTAP system 300, the metadata service 306 may be replaced with a substitute metadata service (e.g., a similar established metadata service). For example, the metadata service 306 may be replaced with a substitute metadata service that is configured to extend support for LSNs through public APIs.

The proxy 302 may be configured to connect user devices 301a-n to the OLTP engine 304 and/or the OLAP engine 308 though a common proxy layer. The proxy 302 may be a smart proxy. The proxy 302 may provide a single unified API (default: ANSL SQL plus some common OLAP extensions) to users/clients, i.e., the underlying system details are transparent to the clients if they connected through the proxy. Various kinds of APIs (e.g., ANSI SQL, JDBC, ODBC, etc.) may be utilized, based on user requirements.

Utilizing a single unified API may reduce user efforts in using the system. The proxy 302 may have the ability to automatically dispatch different client requests/queries to different engines (e.g., the OLTP engine 304 or the OLAP engine 308) based on the nature of the request. For example, a complex OLAP query will be directed to the OLAP engine 308, while DMLs, DDLs and point-lookups queries will be directed to the OLTP engine 304.

The proxy 302 may be configured to be coupled to and/or decoupled from the larger HTAP system 300. If the proxy 302 is decoupled from the larger HTAP system 300, the proxy 302 may be replaced with a substitute common proxy (e.g., a similar established proxy). For example, the proxy 302 may be replaced with a substitute proxy that is configured to extend support for LSNs through public APIs.

Each of the OLTP engine 304, the OLAP engine 308, the storage subsystem 310, and the metadata service 306 may leverage LSNs to ensure strong data consistency in the HTAP system. OLTP engine handles OLTP transactions and generates LSN. LSN for each data update is generated during of the transaction commit process using write-ahead log (WAL). For example, the OLAP engine 304 may coordinate OLAP queries by requesting global read LSNs from metadata service 306 and launching distributed scan tasks to request data using these read LSNs. LSNs are propagated with logs from TP to AP components of the decoupled storage 310 storage and may be applied to a delta store of the storage 310. The storage 310 may use multiple LSNs to indicate the progress/status of various operations. The metadata service 306 may store the progress of persisted LSN on storage servers, and serve it as read_LSN for OLAP queries. The metadata service 306 may also store the schema LSNs to support DDL. The smart proxy 302, by default, is not aware of any LSNs. In READ_YOUR_WRITE consistency mode, the proxy 302 may need to collect the returned LSN of queries and issue the next query with the LSN.

Figure 4:
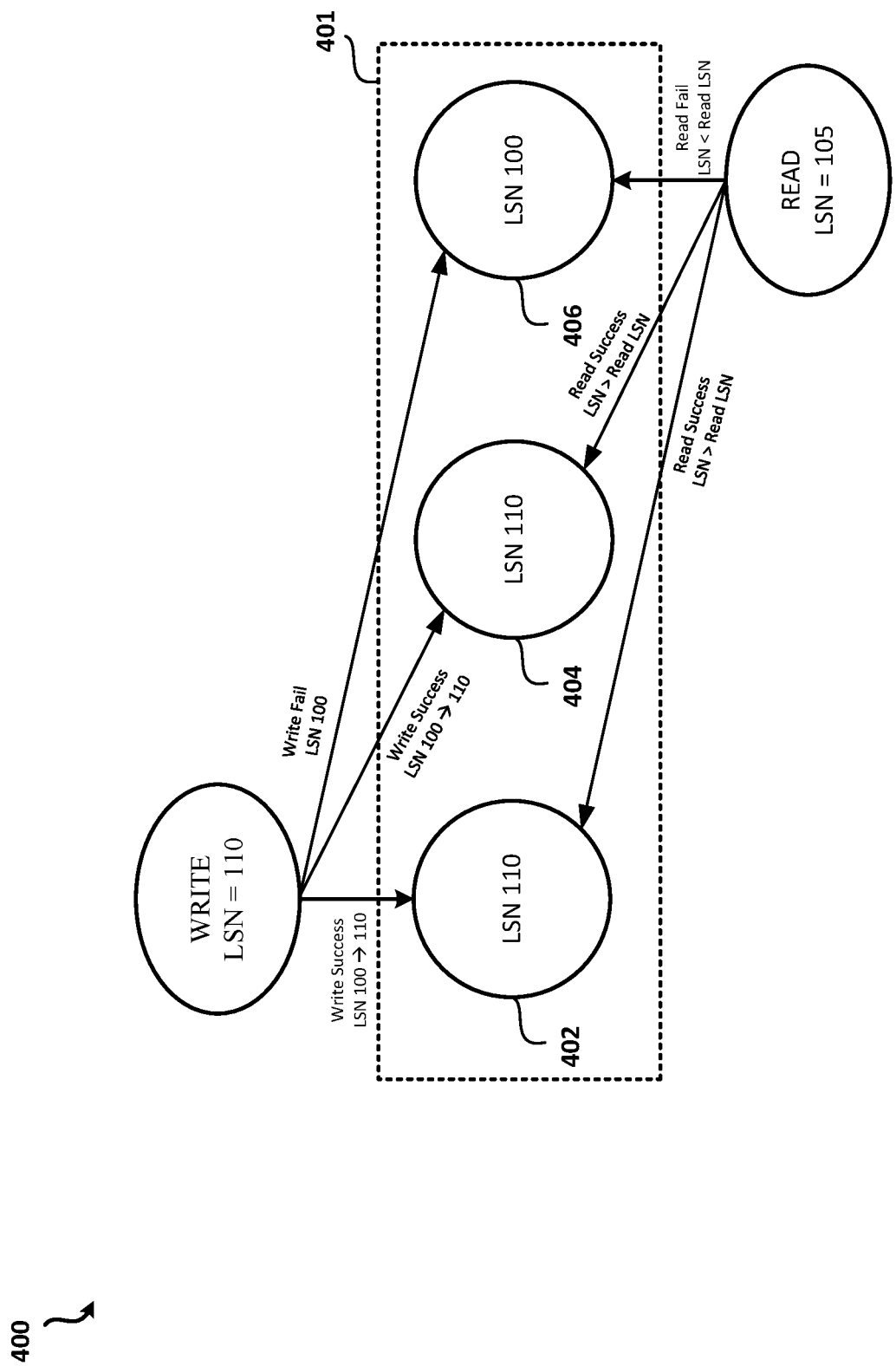
FIG. 4 shows an example architecture for ensuring that data is consistent between replicas during read and write process.

As discussed above, to guarantee strong data consistency in the HTAP system, a global snapshot isolation across OLTP and OLAP engines may be provided using the Quorum protocol and/or the Gossip protocol. Leveraging the Quorum protocol and the Gossip framework may extend a single-partition consistent read and write into a globally distributed cluster. FIG. 4 shows an example architecture 400 for ensuring that data is consistent between replicas during the read and write process. The architecture 400 leverages the Quorum protocol and the Gossip protocol as building to ensure strong data consistency in the HTAP system. Data with replicated partitions may be stored and/or accessed across a plurality of data nodes 402, 404, 406 in a cluster 401. For a given partition, there may be multiple replicas on different nodes keeping the same data for fault tolerance.

A Quorum Protocol may be applied to ensure that data is consistent between these replicas during the read and write process. Quorum is a type of technique that may be used to perform a constant function or operation in a "distributed system". It uses the distributed transaction which obtains minimum votes from the distributed system. With quorum-based data consistency, read and write requests may always be served by multiple healthy nodes (e.g., two or more of the nodes 402, 404, 406, and data across the cluster 401 may be kept in a consistent state. Any failed, corrupt, or slow replica will not expose any data correctness issues, such as outdated, dirty, corrupt data, to the external client.

For example, the architecture 400 utilizes a 2+2 Quorum setup. Each partition is served by 3 replicas/nodes (nodes 402, 404, 406). A write request will be sent to all the 3 replicas/nodes 402, 404, 406 by the framework 400, and a write succeeds after 2 of them succeeds. As shown in FIG. 4, the write request sent to the nodes 402 and 404 were successful and the write request sent to the node 406 failed. However, because the write succeeded for two of the nodes, the write is nevertheless successful. During a read, the framework 400 may inquire at least 2 nodes asking for data status and choose the node with data satisfying a read consistency requirement. Since there are at least 2 nodes holding the latest writes, we can tolerate one node failure and still ensure successful and consistent read. As shown in FIG. 4, the node 406 failed, but the other nodes 402 and 404 was successful. Accordingly, the read was still successful and consistent despite the failure of node 406.

In addition to the Quorum algorithm, a Gossip Protocol may be utilized to remedy any temporary inconsistencies between the replicas 402, 404, 406. A Gossip Protocol is a procedure or process of computer peer-to-peer communication that is based on the way epidemics spread. Some distributed systems use peer-to-peer gossip to ensure that data is disseminated to all members of a group. For example, if any replica 402, 404, 406 is lagging others due to unexpected failures like disk or network failures, with Gossip Protocol the replica will catch up to its peers during inter-node message exchanges. For example, the node 406 may catch up to LSN 110 by itself due to the Gossip protocol.

The Quorum and Gossip protocols may be leveraged to keep data in a consistent state across distributed partitions in a cluster. Additionally, a LSN mechanism may be utilized to ensure that data read and write is consistent locally on each partition. When a query is compiled in a coordinator, a data snapshot for the query may be calculated in the form of a global LSN. The global LSN may be distributed to every node holding the desired partitions and the local data part in respect to the query snapshot LSN may be retrieved. Thus, no more and no less data than necessary will ever be accessed on each node, even if data is updated right after the compilation point in the coordinator.

On a single partition, Log Sequence Number (LSN) may be utilized. A LSN is an integral and incremental number to indicate local storage state. Each partition keeps its own local LSN, while a LSN can also represent a global and logical data snapshot of the storage state across all partitions. For example, when storage has LSN 100, and after a new insert of data arrives, the storage LSN will move to 101. A query may first be assigned a global read_LSN from the metadata service by a coordinator. The global read_LSN maybe the LSN that all storage partitions have been persisted up to when the query is compiled. This a global read_LSN may then be sent to each storage server to determine how much data should be be read locally on each partition. For example, a global read LSN of 100 will retrieve exactly the data on every partition up to LSN 100.

Described below in more detail is the LSNs utilized in OLAP storage. However, it should be appreciated that the OLTP storage of the HTAP system may be handled in a similar manner, and a query in our HTAP system can access both OLAP and OLTP storage in a consistent manner using a single read LSN.

As discussed above with regard to FIG. 3, the foundation of the storage system, per replica per partition of a table, is an in-memory Delta Store and an on-disk Base Store. The Delta Store accepts new data in the form of logical logs, and then converts the logs into two lists: an insertion delta list and a deletion delta list. Current delta lists may be flushed to the Base Store after a predetermined amount of time has elapsed and/or if a capacity criteria is met. Multiple LSNs may be utilized, with each LSN indicating multiple storage states at the same time.

Data in the storage system may constantly be changing due to multiple operations. These operations may include, for example, appending/deleting, scanning, flushing, compacting, and/or garbage collecting (GC). During the append/delete operation, data may be added to the in-memory Delta Store's insert list and delete list. During the scan operation, the current data may be read from the Delta store and the Base store with respect to a read LSN. During the flush operation, data may be flushed from memory to disk. For example, current data may be moved from the Delta Store to the Base Store. During the compact operation, the Base Store data blocks may be reorganized. During the garbage collection operation, old and unused data may be removed from the Delta store and/or the Base store.

Multiple LSNs may be applied to indicate the different states of these operations. With these LSNs, data scan, update, and maintenance operations may work together in a concurrent and coherent way, not interfering with each other. The plurality of LSNs may include a read LSN per query to indicate the data snapshot. This LSN may ensure that scan will retrieve data across all partitions up to the read LSN, assembling a final global result for data up to the read LSN. The plurality of LSNs may additionally include one or more of an LSN to keep the smallest read LSN of active queries, a LSN to keep the finish point of the previous flush, and an LSN to indicate the finish point of next flush. These LSNs guarantee that a scan on each partition will work concurrently with the flush operation and still yield consistent results in respect to the query's read LSN. The plurality of LSNs may additionally include one or more of an LSN to calculate the point where the delta store data can be safely truncated, and an LSN to indicate which base store blocks can be safely truncated. These LSNs ensure that the maintenance operation, such as GC, will work concurrently with scan.

For example, on the Delta Store, the following LSNs may be utilized: min_read_LSN, last_flush_LSN, next_flush_LSN, and/or delta_truncate_LSN. The min_read_LSN may indicate the smallest read LSN of active queries. All alive read LSNs from every query are monitored/kept track of so that the min of all read_LSN may be retrieved to efficiently to determine how much data can be flushed. To make sure the flush operation does not affect a current data scan, only data with an LSN smaller than min_read_LSN may be flushed from the Delta store to the Base store. The last_flush_LSN may indicate the Maximum LSN of the previous flush. After the next flush, it may be reset to the next_flush_LSN. A scan may start from the last_flush_LSN to its read LSN, plus all flushed data in the base storage. While a Delta Store's last_flush_LSN keeps changing with flush, the snapshot of each scan's last_flush_LSN (scan data starts from this LSN) will not change. The next_flush_LSN may indicate the maximum flushed LSN of the next flush. An LSN between min_read_LSN and last_flush_LSN may be chosen as next_flush_LSN, indicating that the rows in [last_flush_LSN, next_flush_LSN] will be flushed. The delta_truncate_LSN may indicate that data with LSN smaller than delta_truncate_LSN can be truncated in a background GC thread, where delta_truncate_LSN=MIN(last_flush_LSN of all live queries, last_flush_LSN of the delta store).

Figure 5:
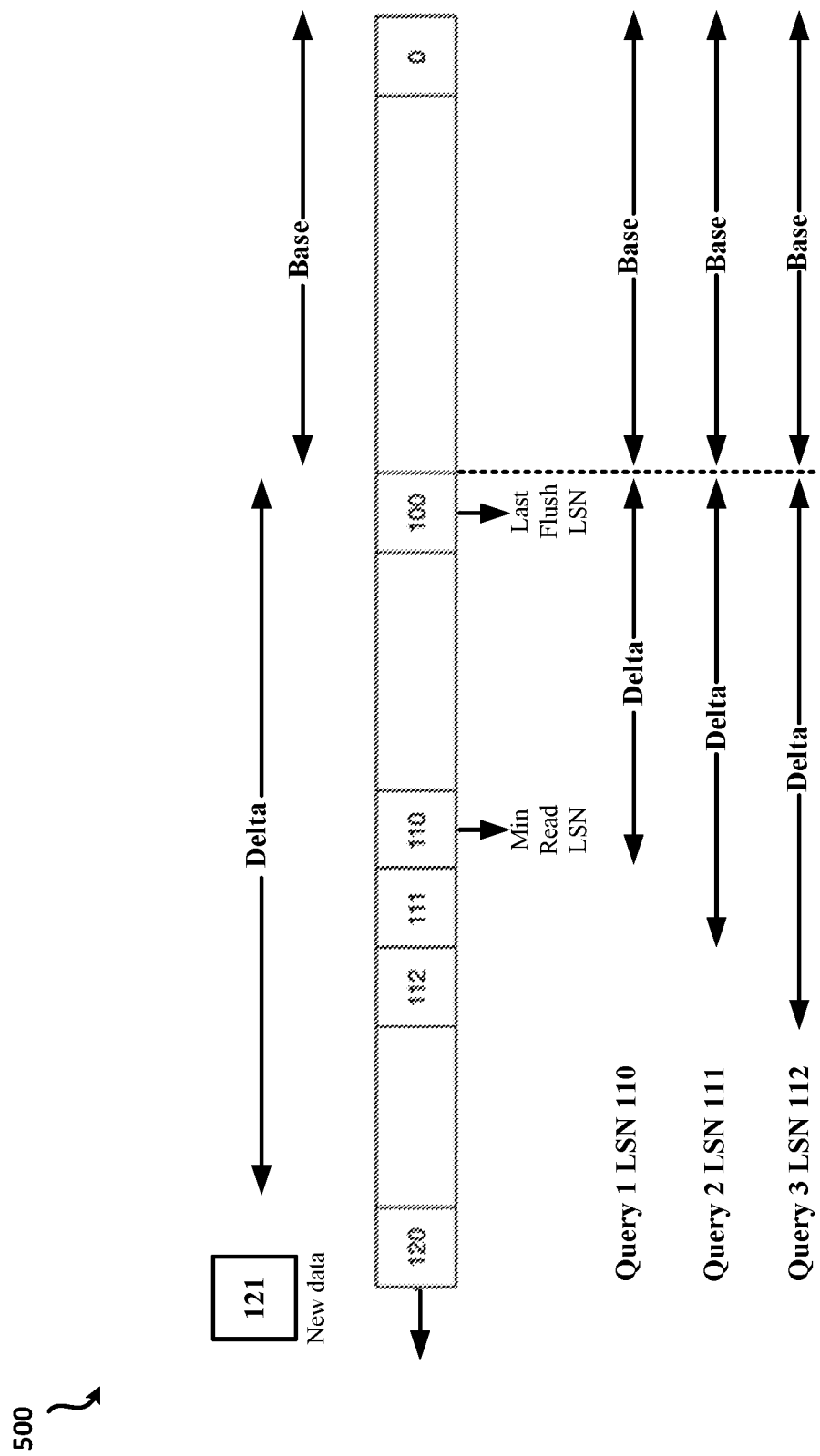
FIG. 5 shows an example snapshot of a delta store and a base store.

An example of these concurrent operations is illustrated in FIG. 5. FIG. 5 depicts an exemplary snapshot 500 of a delta store and a base store. The snapshot 500 indicates that the last flush of the delta store has moved data associated with an LSN<100 to the base store. As a result, the last_flush_LSN is 100. Each active query is holding a read LSN that will read data from last_flush_LSN to its read_LSN on the delta store, and the base store data before the last_flush_LSN. For example, Query 1 with LSN 110 will read [0,100) from the base store and [100, 110] from the delta store. Query 2 will also read [0,100) from the base store and will read [100, 111] from the delta store. As the minimum read LSN of all active queries is the min_read_LSN, 110 (from Query 1) is the min_read_LSN. This min_read_LSN is constantly updating as old queries finish and new queries arrive. If Query 1 finishes before Query 2, the min_read_LSN will be updated to 111.

Figure 6A:
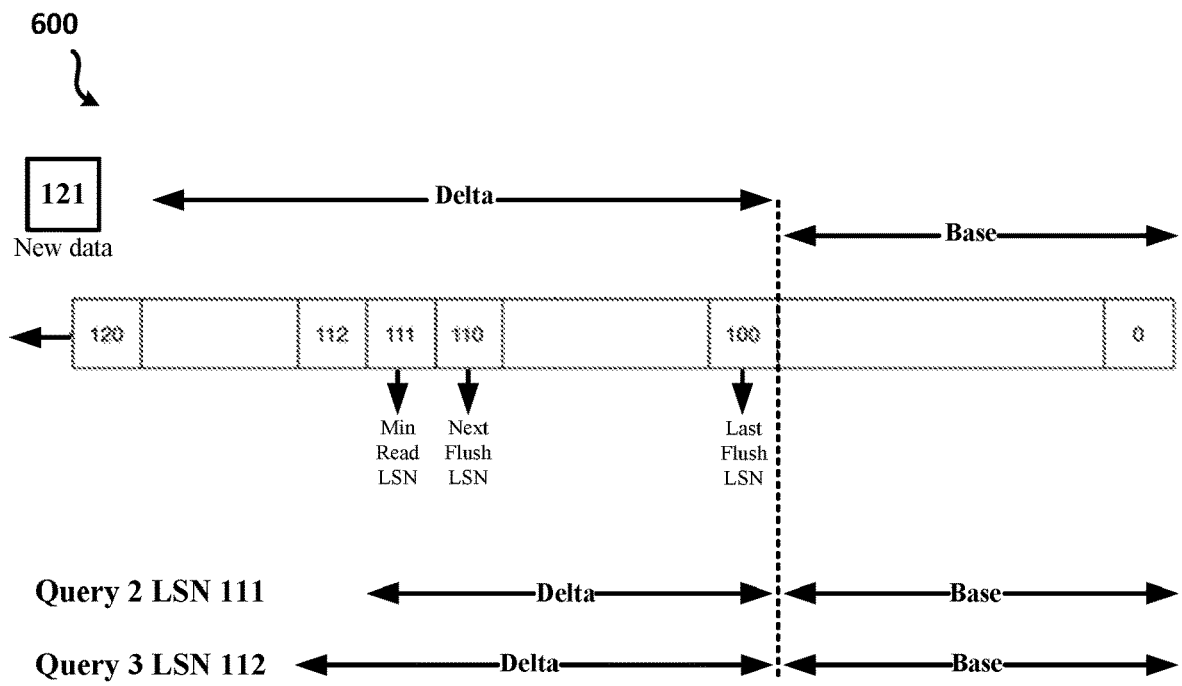
FIG. 6A shows an example snapshot of a delta store and a base store.
Figure 6B:
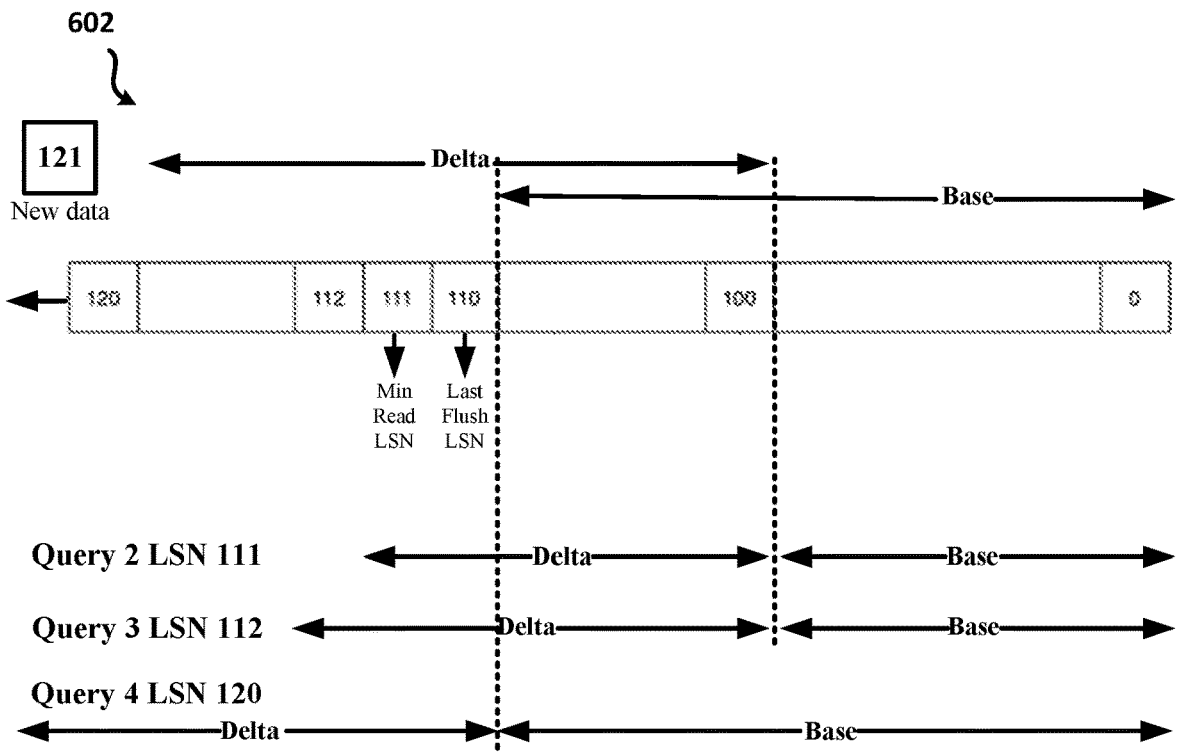
FIG. 6B shows another example snapshot of the delta store and the base store of FIG. 6A.

The next flush may be triggered based on time or delta store capacity criteria. FIGS. 6A-B show example snapshots 600, 601 of a delta store and a base store. The snapshot 600 depicts the delta store and the base store before the next flush, and the snapshot 601 depicts the delta store and the base store after the next flush. To determine how much data to flush in the next flush, a next_flush_LSN that is smaller than current min_read_LSN is selected. For example, the next_flush_LSN may be 110, which is smaller than current min_read_LSN of 111. The delta store will then flush data between [last_flush_LSN, next_flush_LSN), which is [100, 110). At the flush finish point, the last_flush_LSN will be updated to next_flush_LSN. The flush will not remove any data in the delta store, and active queries, which read data from its own last_flush_LSN (a snapshot per query), will not update this LSN with flush. After the flush finishes, new queries hat arrive will start to use the new_last_flush_LSN (110). For example, query 4 will start to use the new last_flush_LSN (110). In this way, flush may work concurrently with scan without affecting the query results.

Figure 7A:
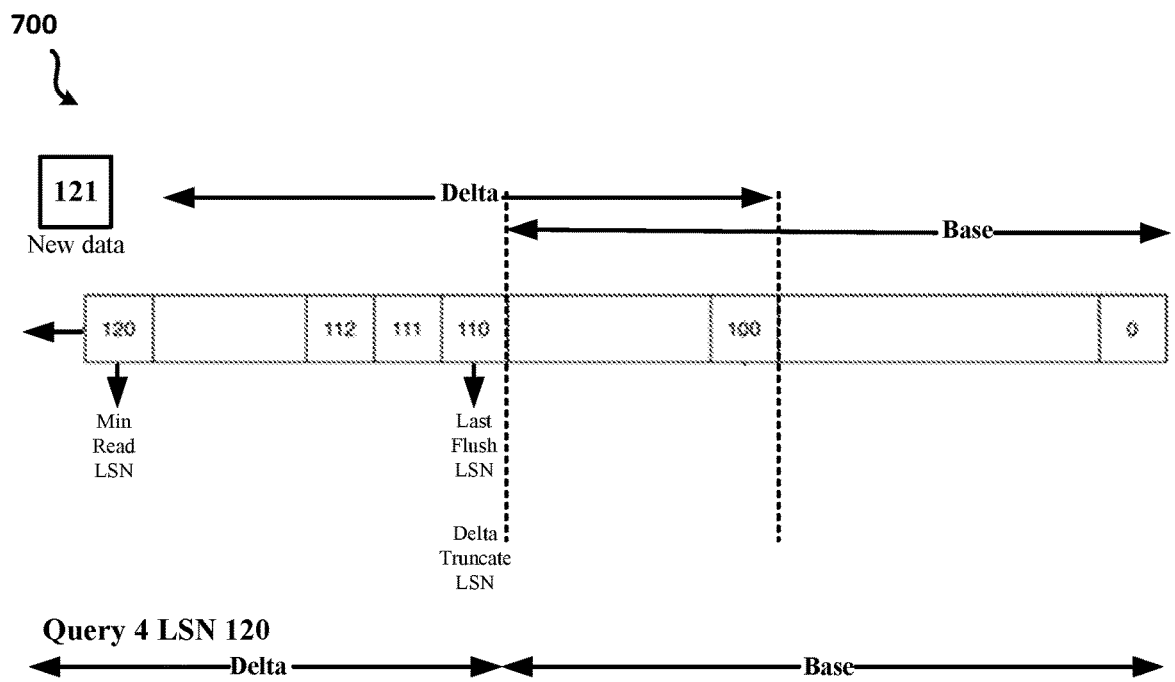
FIG. 7A shows an example snapshot of a delta store and a base store.
Figure 7B:
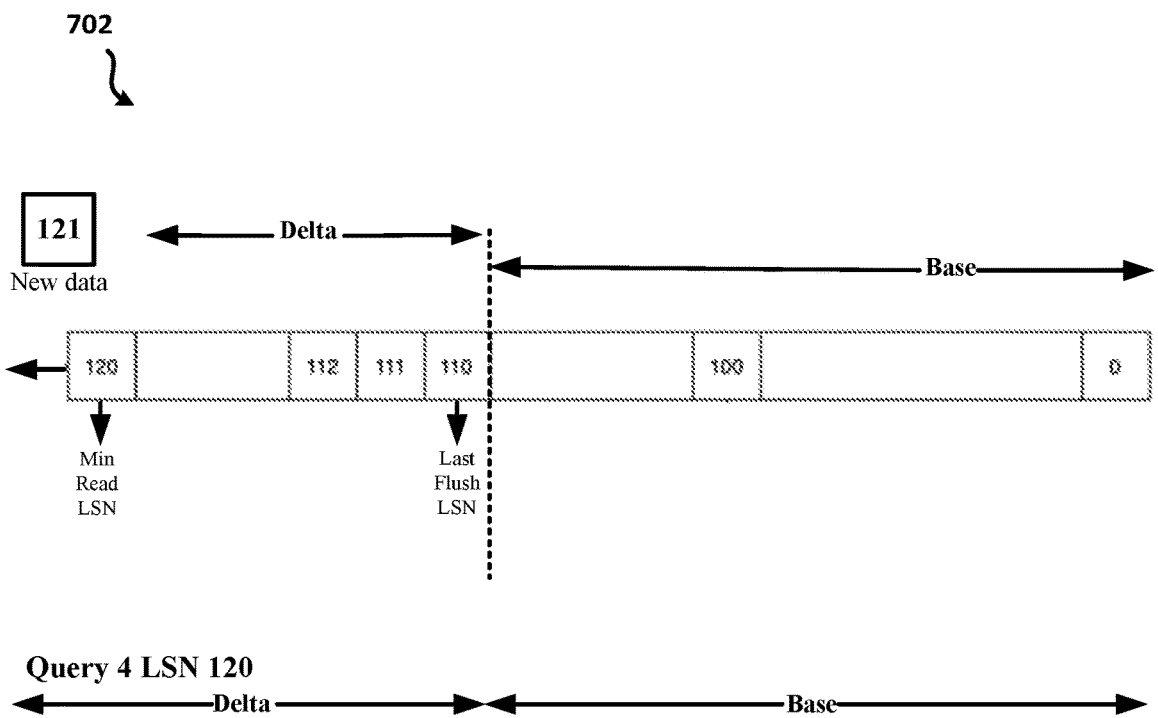
FIG. 7B shows another example snapshot of the delta store and the base store of FIG. 7A.

During the garbage collection operation, old and unused data may be removed from the Delta store and/or the Base store. FIGS. 7A-B show example snapshots 700, 701 of a delta store and a base store during a garbage collect (GC) operation. The snapshot 700 depicts the delta store and the base store before the GC operation, and the snapshot 701 depicts the delta store and the base store after the GC operation. The GC operation on the delta store will select delta_truncate_LSN as MIN (last_flush_LSN of all live queries, last_flush_LSN of the delta store), which in this example is 110. This means all live queries and future queries will not need to scan the delta store before LSN 110, and those data can be safely removed from the delta store concurrently with live scans, without affecting any queries' scan results.

For the base store, there may be two alternative implementations. The first implementation is a Base store with versioned data. Each row in the base store will keep the LSN. A scan on the base store can use Read LSN and it is possible to enable time travel for scan. The second alternative implementation is a Base store with no explicit version. A scan always reads all the data in the base store. The non-versioned base store may be more efficient on scan and delete, and may save storage space.

The Base Store may also have maintenance operations like compacting and GCing, similar to the Delta Store. The operations work on Base Store data blocks, and thus, will not affect the Delta Store. To have the Scan and maintenance operations work in parallel, at the beginning of a scan, query will take a snapshot of all live data blocks from this Base Store. Old blocks, if removed, are changed to invisible at the finish point and also tagged with base_truncate_LSN which is the max read_LSN of live queries at the finish point. After all active queries with read_LSN<=base_truncate_LSN finish, those old blocks in the GC thread may be removed. In sum, multiple concurrent operations such as data insert, query scan, flush, compaction, and GC are utilized on our delta and base stores, and LSNs are utilized to ensure that these operations can work concurrently while still delivering consistent results to the query client.

Consistency during read, write and maintenance operations is ensured in the manner described above. Additionally, consistent metadata and Data Definition Language (DDL) operations are ensured using a centralized metadata service. The HTAP system described herein is capable of handling distributed DDL operations by using a metadata service to store schema version LSN and distribute to all storage nodes. The metadata service may be used to store schema version LSN and distribute to all storage nodes. For example, the centralized metadata service will hold in-memory and persist the HTAP table and partition schema, plus, the most recent DDL LSN of each table for representing its metadata version. On each HTAP store server, a managed partition will also hold its own metadata version.

A DDL update may be accomplished via the following steps. DDL operations from OLTP, such as create table or schema update, may issue a DDL update log with LSN to HTAP storage. The metadata service may periodically pull DDL info (e.g., the newest DDL LSN) from OLTP. If there are changes, the metadata service may first persist the newest LSN as the metadata version, and then it may pull newest catalog info like schemas from an OLTP catalog using this LSN. After the catalog information is updated, the metadata service may update the corresponding entries of the in-memory and persisted HTAP partition info and stats table. Later, the DDL log may be broadcasted to all partitions, and may be applied by log applier when arriving at Delta Stores. For the partitions with the table(s) that the DDL affects, their schema may be modified accordingly. For other partitions, they may merely update their metadata version (to this DDL LSN).

During a scan query's compilation time, the query in a centralized coordinator is able to get metadata information that is consistent with the read_LSN. Thus, the actual scan task on each partition can compare its read_LSN with the metadata version LSN of this partition to determine if the current metadata version of this partition is consistent with the query's read LSN.

For example, if the query's read_LSN is 1000 and the metadata LSN is 900, this means that the query is compiled using the up-to-date schema and that the query is in good standing. On the other hand, if the metadata is updated and bumped to 1100 after the query is compiled, the partition version LSN is updated accordingly before the scan arrives. In this case read_LSN may be 1000 while metadata is 1100, which indicates that the partition's schema has been updated. The scan may be recompiled with an updated read_LSN to ensure that the scan always reads data with a schema that is consistent with the one when the scan is compiled.

The HTAP system describes herein provides a scan function to generate globally consistent scan results, enabled by a centralized compilation service (coordinator) to retrieve a read LSN from metadata service, a distributed query execution environment which launches scan tasks to retrieve data on partitions in respect to the read LSN, and a storage system capable of supporting concurrent insert, update, delete, flush, compaction, and GC operations, while still providing scan result consistent to the read LSN.

A scan on a table may be distributed as one scan task per partition, using the same read LSN across all tasks. The steps may be illustrated as follows to ensure that a scan is the aggregated results from sub tasks. Each task may retrieve the exact data for the partition up to a query specific read LSN. First, a query may get compiled in the coordinator, after fetching the DDL info and read LSN from the metadata service. Then, the query may create scan distributed tasks, each task reading one or more partitions.

For example, if the Read LSN is 1000, each query sub task may start a read client. A client may initiate a round-trip of collecting LSNs from the replicas of this partition and then choose the replica with the LSN that is greater than or equal to the Read LSN, or one of the largest LSNs. This may follow the quorum protocol discussed above. For example, If 3 replicas hold LSN 1100, 1100, 900, any of the first two replicas can be chosen. If 3 replicas hold 900, 900, 800, which means the latest updates are not on this partition's replicas, we choose one of the largest which is 900. If one node fails and only two replicas return results, we will choose the one with larger LSN.

The client may send the scan request to the server managing the desired replica. The scan on the server may start until all logs less than or equal to the Read_LSN (1000) in this partition have been applied to the Delta Store in memory, even if this requires a small wait period. The gossip protocol may be invoked to fill up the "holes" in LSNs. The scan may check its read_LSN with the metadata version LSN of this partition. The query may fail and retry if the metadata LSN is greater than the read_LSN. If the metadata version is 1100, this may indicate that the query is compiled using an old version of metadata and that the query may need to re-compile.

The scan may read the delta store from the last_flush_LSN snapshot to its read LSN (1000). A delete hash map may need to be checked to filter out rows that are deleted afterwards so that they should not appear in the snapshot. For example, if a row's insert LSN is 800 while its delete LSN is 900, both <1000, so this row may not appear in the results.

The scan may read flushed data on the base store. Predicate filters and projection columns may be applied to reduce the data needed to scan from disk. In addition, the delete bitmap within the base store may be checked to exclude deleted rows. The results of the base store scan also need to exclude the deleted rows in Delta store's delete map based on row's primary key matching and the scan row's read_LSN greater than or equal to the delete row's delete_LSN. For example, if a row's delete LSN is 900, which is smaller than 1000, this row from the base store may not be included. The combined scan results may be returned to client. If the return data size is large, multiple roundtrips of continuous scan may be used.

While the techniques as described above, by default, provide strong data consistency for hybrid transactional and analytical data processing, flexibility may additionally or alternatively be provided to users who wish to adjust the consistency levels based on per use case. If QUERY_DEFAULT is selected, the Read LSN is the checkpoint_LSN from log dispatcher. Any LSN before this LSN is guaranteed to be received and persisted by the HTAP storage. The metadata server may periodically fetch the checkpoint_LSN from the log dispatcher and cache it. There could be a theoretical delay for a scan task, if the log up to checkpoint_LSN is persisted, but not applied to delta store in-memory yet. This may be the default mode and the most common use case for a user who wants to have strong consistency with minimal wait time.

If QUERY_LATEST is selected, the Read LSN is the latest committed LSN from OLTP Log Store. Compared to QUERY_DEFAULT, this mode has strong consistency and better data freshness, although it may be associated with additional delay since the OLAP query coordinator has to wait until the checkpoint_LSN becomes greater than or equal to that LSN before executing the query to make sure HTAP Stores already have logs up to that LSN. The theoretical delay in QUERY_DEFAULT also applies in this mode.

If QUERY_DIRTY_READ is selected, the user can opt to loosen the data consistency requirement and choose to perform a read on the latest available data on each partition. No Read LSN will be used during the scan, and thus, no wait time is needed during the scan. Scan in this mode may experience the best-effort data freshness and latency, however, may read early or late data in this mode with no consistency guarantee.

If READ_YOUR_WRITE is selected, the commit LSNs of each transaction may be propagated back to the client session that issues them. The client session can use these LSNs as its read_LSNs for its subsequent OLAP queries. This provides stronger data consistency and freshness than other modes for a single client, but may introduce additional wait time since the OLAP query coordinator has to wait until the checkpoint_LSN becomes greater than or equal to that LSN before executing the query to make sure HTAP Stores already have log persisted up to that LSN. The theoretical delay in QUERY_DEFAULT also applies in this mode FIG. 8 illustrates an example process 800 that may be performed by a HTAP system, e.g., the HTAP system 300 as shown in FIG. 3. The HTAP system may perform the process 800 to ensure strong data consistency in the HTAP system. Although depicted as a sequence of operations in FIG. 8, those of ordinary skill in the art will appreciate that various embodiments may add, remove, reorder, or modify the depicted operations.

Data may be captured by a first computing system in real-time (or near real-time). The first computing system may be, for example, an OLTP engine (e.g., OLTP engine 304). At 802, logical logs and log serial numbers (LSNs) associated with the logical logs may be generated based on data captured by the first processing engine. A LSN is an integral and incremental number indicative of a storage state. For example, the LSN associated with a particular logical log may indicate a storage state of that logical log.

At 804, the logical logs and the LSNs may be propagated to a storage subsystem. The storage subsystem may be configured to be in communication with the first processing engine and a second processing engine. The second processing engine may be, for example, configured to perform online analytical processing (OLAP). The architecture of the HTAP system described herein may provide fresh/real-time data changes for OLAP queries. Logical logs of DMLs may be immediately propagated from the OLTP component to the OLAP component upon commit. These logs may be dispatched to distributed partitions and may be continuously applied to in-memory Delta Stores via in-memory operations, which are usually very fast. Data changes carried by logical logs may be immediately available for OLAP queries upon being applied to in-memory Delta Stores. A unified version control across the HTAP system may be utilized by the architecture of the HTAP system so that strong data consistency is guaranteed. The OLTP component of the HTAP system may additionally support snapshot isolation and other (weaker) consistency models.

At 806, the LSNs and information indicative of LSN schema versions may be stored and distributed by a metadata service. The metadata service may store the progress of persisted LSN on storage servers, and serve it as read_LSN for OLAP queries. The metadata service may also store the schema LSNs to support DDL. The first processing engine, the second processing engine, the storage subsystem, and the metadata service may each be modularized and may each support a LSN mechanism for maintaining data consistency. For example, each of the first processing engine, the second processing engine, the storage subsystem, and the metadata service may be configured to be decoupled from the larger HTAP system and replaced with a substitute component that is configured to extend support for LSNs through public APIs.

Figure 9:
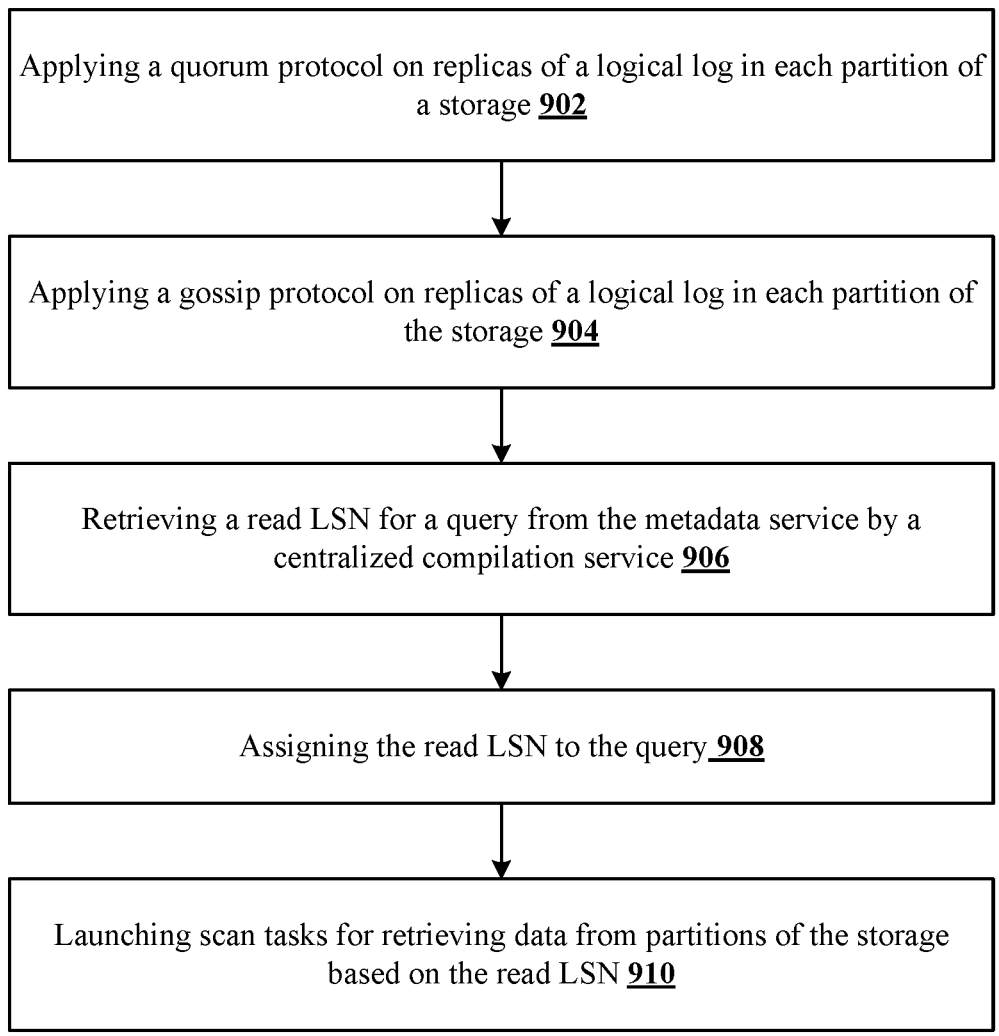
FIG. 9 shows an example process for ensuring strong data consistency in a hybrid transactional and analytical processing system.

FIG. 9 illustrates an example process 900 that may be performed by a HTAP system, e.g., the HTAP system 300 as shown in FIG. 3. The HTAP system may perform the process 900 to ensure strong data consistency in the HTAP system. Although depicted as a sequence of operations in FIG. 9, those of ordinary skill in the art will appreciate that various embodiments may add, remove, reorder, or modify the depicted operations.

As discussed above, to guarantee strong data consistency in the HTAP system, a global snapshot isolation across OLTP and OLAP engines may be provided using the Quorum protocol and/or the Gossip protocol. Leveraging the Quorum protocol and the Gossip framework may extend a single-partition consistent read and write into a globally distributed cluster. Data with replicated partitions may be stored and/or accessed across a plurality of data nodes in a cluster. For a given partition, there may be multiple replicas on different nodes keeping the same data for fault tolerance.

At 902, a quorum protocol may be applied on replicas of a logical log in each partition of the storage subsystem. The Quorum Protocol may be applied to ensure that data is consistent between these replicas during the read and write process. Quorum is a type of technique that may be used to perform a constant function or operation in a "distributed system". It uses the distributed transaction which obtains minimum votes from the distributed system. With quorum-based data consistency, read and write requests may always be served by multiple healthy nodes (e.g., two or more of the nodes), and data across the cluster may be kept in a consistent state. Any failed, corrupt, or slow replica will not expose any data correctness issues, such as outdated, dirty, corrupt data, to the external client.

For example, the architecture 400 described above with respect to FIG. 4 utilizes a 2+2 Quorum setup. Each partition is served by 3 replicas/nodes (nodes 402, 404, 406). A write request will be sent to all the 3 replicas/nodes 402, 404, 406 by the framework 400, and a write succeeds after 2 of them succeeds. As shown in FIG. 4, the write request sent to the nodes 402 and 404 were successful and the write request sent to the node 406 failed. However, because the write succeeded for two of the nodes, the write is nevertheless successful. During a read, the framework 400 may inquire at least 2 nodes asking for data status and choose the node with data satisfying a read consistency requirement. Since there are at least 2 nodes holding the latest writes, we can tolerate one node failure and still ensure successful and consistent read. As shown in FIG. 4, the node 406 failed, but the other nodes 402 and 404 was successful. Accordingly, the read was still successful and consistent despite the failure of node 406.

In addition to the Quorum algorithm, a Gossip Protocol may be utilized to remedy any temporary inconsistencies between the replicas. At 904, a gossip protocol may be applied on replicas of a logical log in each partition of the storage subsystem. A Gossip Protocol is a procedure or process of computer peer-to-peer communication that is based on the way epidemics spread. Some distributed systems use peer-to-peer gossip to ensure that data is disseminated to all members of a group. For example, if any replica is lagging others due to unexpected failures like disk or network failures, with Gossip Protocol the replica will catch up to its peers during inter-node message exchanges.

The Quorum and Gossip protocols may be leveraged to keep data in a consistent state across distributed partitions in a cluster. Additionally, a LSN mechanism may be utilized to ensure that data read and write is consistent locally on each partition. When a query is compiled in a coordinator, a data snapshot for the query may be calculated in the form of a global LSN. The global LSN may be distributed to every node holding the desired partitions and the local data part in respect to the query snapshot LSN may be retrieved. Thus, no more and no less data than necessary will ever be accessed on each node, even if data is updated right after the compilation point in the coordinator.

On a single partition, Log Sequence Number (LSN) may be utilized. A LSN is an integral and incremental number to indicate local storage state. At 906, a read LSN for a query may be retrieved from the metadata service by a centralized compilation service. Each partition keeps its own local LSN, while a LSN can also represent a global and logical data snapshot of the storage state across all partitions. For example, when storage has LSN 100, and after a new insert of data arrives, the storage LSN will move to 101.

A query may first be assigned a global read_LSN from the metadata service by a coordinator. At 908, the read LSN may be assigned to the query. The global read_LSN maybe the LSN that all storage partitions have been persisted up to when the query is compiled. This a global read_LSN may then be sent to each storage server to determine how much data should be read locally on each partition. For example, a global read LSN of 100 will retrieve exactly the data on every partition up to LSN 100.

At 910, scan tasks may be launched for retrieving data from partitions of the storage subsystem based on the read LSN. For example, the OLAP engine may coordinate OLAP queries by requesting global read LSNs from metadata service and launching distributed scan tasks to request data using these read LSNs. The read LSN may ensure that scan will retrieve data across all partitions up to the read LSN, assembling a final global result for data up to the read LSN. The plurality of LSNs may additionally include one or more of an LSN to keep the smallest read LSN of active queries, a LSN to keep the finish point of the previous flush, and an LSN to indicate the finish point of next flush. These LSNs guarantee that a scan on each partition will work concurrently with the flush operation and still yield consistent results in respect to the query's read LSN. The plurality of LSNs may additionally include one or more of an LSN to calculate the point where the delta store data can be safely truncated, and an LSN to indicate which base store blocks can be safely truncated. These LSNs additionally ensure that the maintenance operation, such as GC, will work concurrently with scan.

Figure 10:
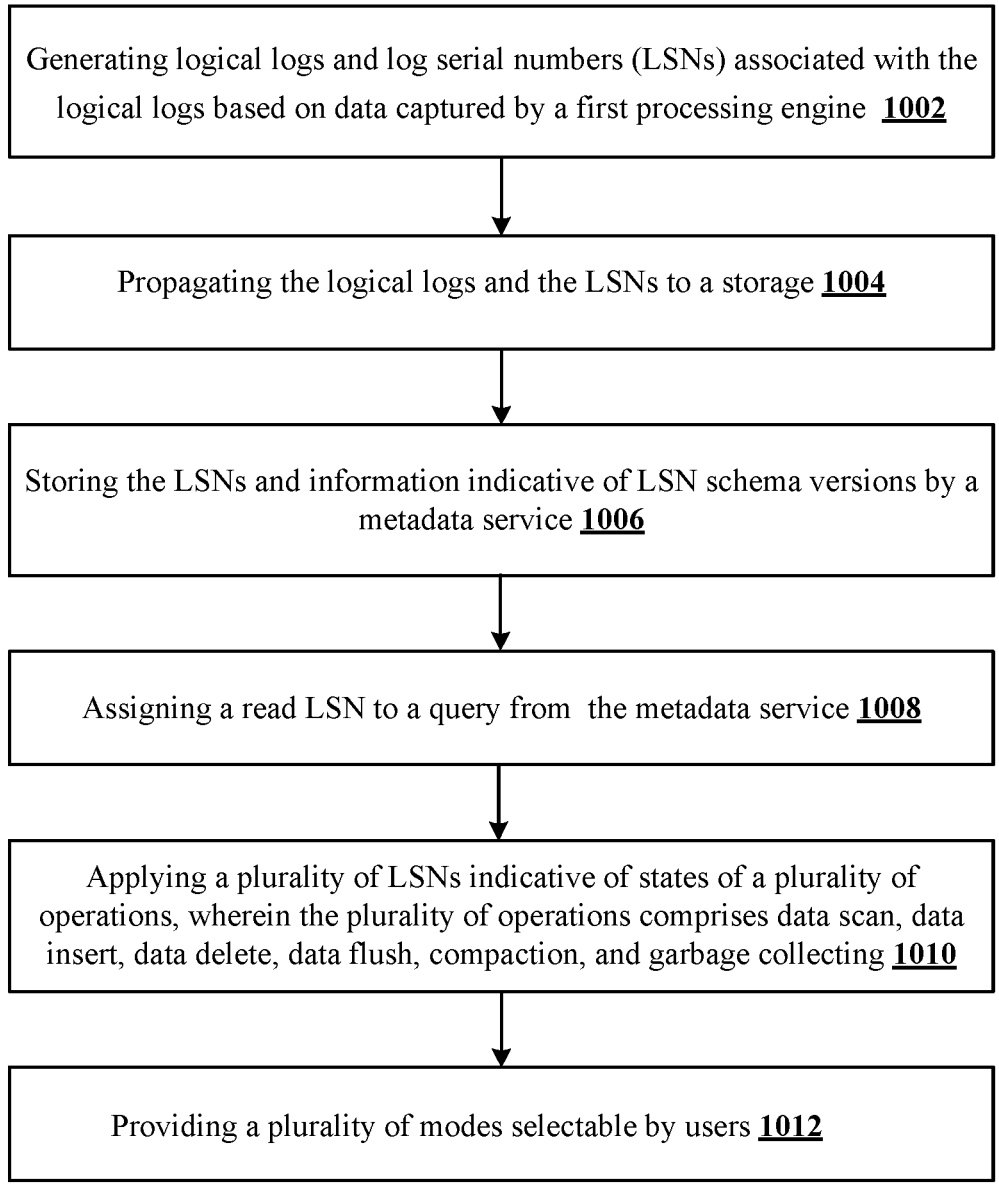
FIG. 10 shows an example process for ensuring strong data consistency in a hybrid transactional and analytical processing system.

FIG. 10 illustrates an example process 1000 that may be performed by a HTAP system, e.g., the HTAP system 300 as shown in FIG. 3. The HTAP system may perform the process 1000 to ensure strong data consistency in the HTAP system. Although depicted as a sequence of operations in FIG. 10, those of ordinary skill in the art will appreciate that various embodiments may add, remove, reorder, or modify the depicted operations.

Data may be captured by a first computing system in real-time (or near real-time). The first computing system may be, for example, an OLTP engine (e.g., OLTP engine 304). At 1002, logical logs and log serial numbers (LSNs) associated with the logical logs may be generated based on data captured by the first processing engine.

At 1004, the logical logs and the LSNs may be propagated to a storage subsystem. A LSN is an integral and incremental number indicative of a storage state. For example, the LSN associated with a particular logical log may indicate a storage state of that logical log. The storage subsystem may be configured to be in communication with the first processing engine and a second processing engine. The second processing engine may be, for example, configured to perform online analytical processing (OLAP).

The logical logs and the LSNs may be propagated to a storage subsystem. The storage subsystem may be configured to be in communication with the first processing engine and a second processing engine. The second processing engine may be, for example, configured to perform online analytical processing (OLAP). The architecture of the HTAP system described herein may provide fresh/real-time data changes for OLAP queries. Logical logs of DMLs may be immediately propagated from the OLTP component to the OLAP component upon commit. These logs may be dispatched to distributed partitions and may be continuously applied to in-memory Delta Stores via in-memory operations, which are usually very fast. Data changes carried by logical logs may be immediately available for OLAP queries upon being applied to in-memory Delta Stores. A unified version control across the HTAP system may be utilized by the architecture of the HTAP system so that strong data consistency is guaranteed. The OLTP component of the HTAP system may additionally support snapshot isolation and other (weaker) consistency models.

At 1006, the LSNs and information indicative of LSN schema versions may be stored by a metadata service. The metadata service may store the progress of persisted LSN on storage servers, and serve it as read_LSN for OLAP queries. The metadata service may also store the schema LSNs to support DDL.

A LSN mechanism may be utilized to ensure that data read and write is consistent locally on each partition. When a query is compiled in a coordinator, a data snapshot for the query may be calculated in the form of a global LSN. The global LSN may be distributed to every node holding the desired partitions and the local data part in respect to the query snapshot LSN may be retrieved. Thus, no more and no less data than necessary will ever be accessed on each node, even if data is updated right after the compilation point in the coordinator.

On a single partition, Log Sequence Number (LSN) may be utilized. A LSN is an integral and incremental number to indicate local storage state. A read LSN for a query may be retrieved from the metadata service by a centralized compilation service. Each partition keeps its own local LSN, while a LSN can also represent a global and logical data snapshot of the storage state across all partitions. For example, when storage has LSN 100, and after a new insert of data arrives, the storage LSN will move to 101.

A query may first be assigned a global read_LSN from the metadata service by a coordinator. At 1008, the read LSN may be assigned to the query. The global read_LSN maybe the LSN that all storage partitions have been persisted up to when the query is compiled. This a global read_LSN may then be sent to each storage server to determine how much data should be read locally on each partition. For example, a global read LSN of 100 will retrieve exactly the data on every partition up to LSN 100.

Data in the storage system may constantly be changing due to multiple operations. These operations may include, for example, appending/deleting, scanning, flushing, compacting, and/or garbage collecting (GC). During the append/ delete operation, data may be added to the in-memory Delta Store's insert list and delete list. During the scan operation, the current data may be read from the Delta store and the Base store with respect to a read LSN. During the flush operation, data may be flushed from memory to disk. For example, current data may be moved from the Delta Store to the Base Store. During the compact operation, the Base Store data blocks may be reorganized. During the garbage collection operation, old and unused data may be removed from the Delta store and/or the Base store.

Multiple LSNs may be applied to indicate the different states of these operations. At 1010, a plurality of LSNs indicative of states of a plurality of operations may be applied, wherein the plurality of operations comprises data scan, data insert, data delete, data flush, compaction, and garbage collecting. With these LSNs, data scan, update, and maintenance operations may work together in a concurrent and coherent way, not interfering with each other. The plurality of LSNs may include a read LSN per query to indicate the data snapshot. This LSN may ensure that scan will retrieve data across all partitions up to the read LSN, assembling a final global result for data up to the read LSN. The plurality of LSNs may additionally include one or more of an LSN to keep the smallest read LSN of active queries, a LSN to keep the finish point of the previous flush, and an LSN to indicate the finish point of next flush. These LSNs guarantee that a scan on each partition will work concurrently with the flush operation and still yield consistent results in respect to the query's read LSN. The plurality of LSNs may additionally include one or more of an LSN to calculate the point where the delta store data can be safely truncated, and an LSN to indicate which base store blocks can be safely truncated. These LSNs ensure that the maintenance operation, such as GC, will work concurrently with scan.

Flexibility may additionally or alternatively be provided to users who wish to adjust the consistency levels based on per use case. At 1012, a plurality of modes may be provided. The plurality of modes may be selectable by users. The modes may include, for example, QUERY_DEFAULT, QUERY_LATEST, QUERY_DIRTY_READ, READ_Y-OUR_WRITE, and/or any other mode by which the user can select a desired consistency level.

If QUERY_DEFAULT is selected, the Read LSN is the checkpoint_LSN from log dispatcher. Any LSN before this LSN is guaranteed to be received and persisted by the HTAP storage. The metadata server may periodically fetch the checkpoint_LSN from the log dispatcher and cache it. There could be a theoretical delay for a scan task, if the log up to checkpoint_LSN is persisted, but not applied to delta store in-memory yet. This may be the default mode and the most common use case for a user who wants to have strong consistency with minimal wait time.

If QUERY_LATEST is selected, the Read LSN is the latest committed LSN from OLTP Log Store. Compared to QUERY_DEFAULT, this mode has strong consistency and better data freshness, although it may be associated with additional delay since the OLAP query coordinator has to wait until the checkpoint_LSN becomes greater than or equal to that LSN before executing the query to make sure HTAP Stores already have logs up to that LSN. The theoretical delay in QUERY_DEFAULT also applies in this mode.

If QUERY_DIRTY_READ is selected, the user can opt to loosen the data consistency requirement and choose to perform a read on the latest available data on each partition. No Read LSN will be used during the scan, and thus, no wait time is needed during the scan. Scan in this mode may experience the best-effort data freshness and latency, however, may read early or late data in this mode with no consistency guarantee.

If READ_YOUR_WRITE is selected, the commit LSNs of each transaction may be propagated back to the client session that issues them. The client session can use these LSNs as its read_LSNs for its subsequent OLAP queries. This provides stronger data consistency and freshness than other modes for a single client, but may introduce additional wait time since the OLAP query coordinator has to wait until the checkpoint_LSN becomes greater than or equal to that LSN before executing the query to make sure HTAP Stores already have log persisted up to that LSN. The theoretical delay in QUERY_DEFAULT also applies in this mode.

Figure 11:
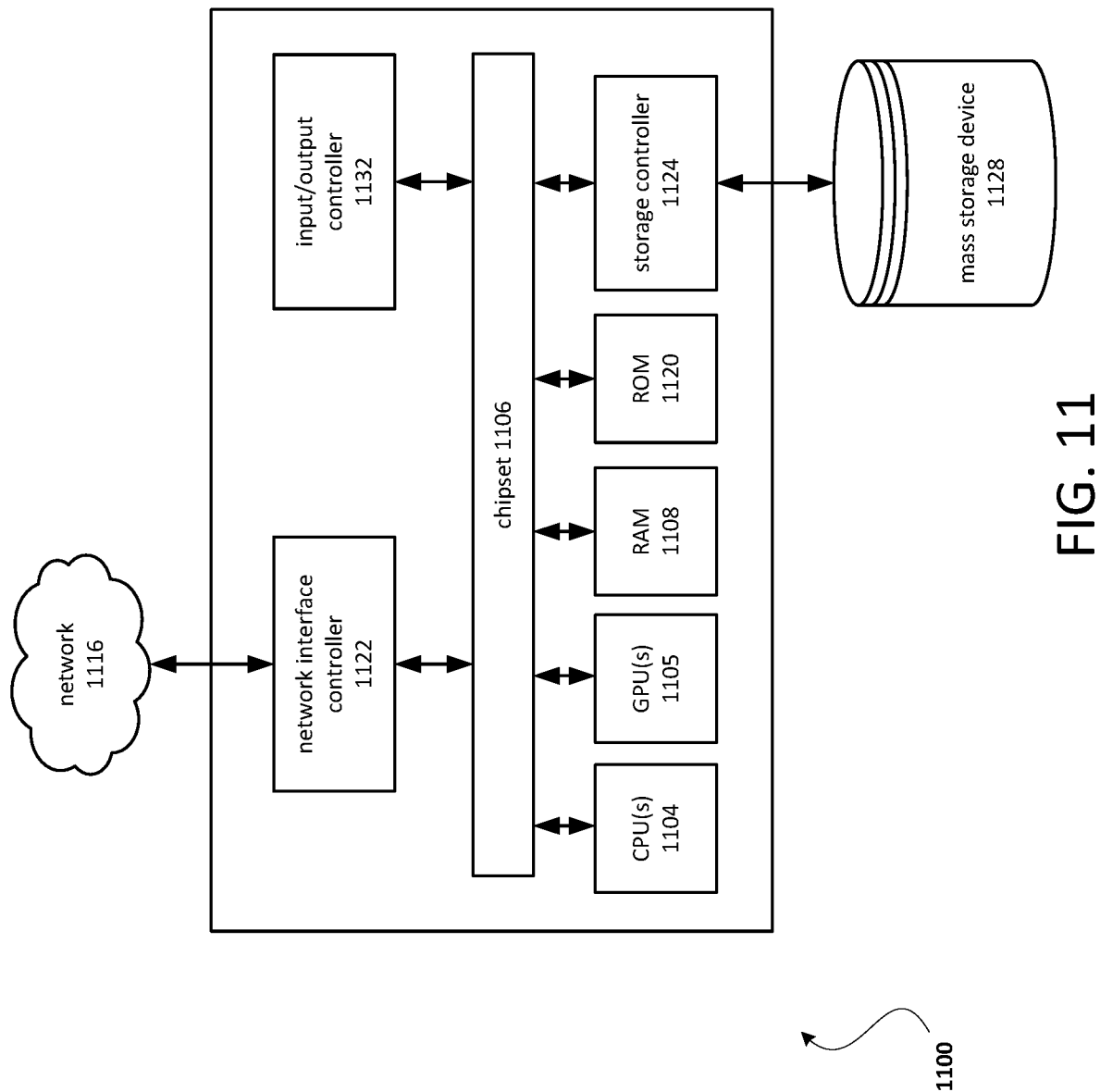
FIG. 11 shows an example computing device which may be used to perform any of the techniques disclosed herein.

FIG. 11 illustrates a computing device that may be used in various aspects, such as the services, networks, modules, and/or devices depicted in FIG. 1. With regard to the example architecture of FIG. 1, cloud network 102, the network 120, the client devices 104a-d, the service 112, the HTAP system 110, and/or the node 118 may each be implemented by one or more instance of a computing device 1100 of FIG. 11. The computer architecture shown in FIG. 11 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1104 may be augmented with or replaced by other processing units, such as GPU(s) 1105. The GPU(s) 1105 may comprise processing units specialized for but not necessarily limited to highly parallel computations, such as graphics and other visualization-related processing.

A chipset 1106 may provide an interface between the CPU(s) 1104 and the remainder of the components and devices on the baseboard. The chipset 1106 may provide an interface to a random-access memory (RAM) 1108 used as the main memory in the computing device 1100. The chipset 1106 may further provide an interface to a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein.

The computing device 1100 may operate in a networked environment using logical connections to remote computing nodes and computer systems through local area network (LAN). The chipset 1106 may include functionality for providing network connectivity through a network interface controller (NIC) 1122, such as a gigabit Ethernet adapter. A NIC 1122 may be capable of connecting the computing device 1100 to other computing nodes over a network 1116. It should be appreciated that multiple NICs 1122 may be present in the computing device 1100, connecting the computing device to other types of networks and remote computer systems.

The computing device 1100 may be connected to a mass storage device 1128 that provides non-volatile storage for the computer. The mass storage device 1128 may store system programs, application programs, other program modules, and data, which have been described in greater detail herein. The mass storage device 1128 may be connected to the computing device 1100 through a storage controller 1124 connected to the chipset 1106. The mass storage device 1128 may consist of one or more physical storage units. The mass storage device 1128 may comprise a management component 1010. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on the mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1128 is characterized as primary or secondary storage and the like.

For example, the computing device 1100 may store information to the mass storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may further read information from the mass storage device 1128 by detecting the physical states or characteristics of one or more particular locations within the physical storage units.

In addition to the mass storage device 1128 described above, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1128 may store other system or application programs and data utilized by the computing device 1100.

The mass storage device 1128 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by specifying how the CPU(s) 1104 transition between states, as described above. The computing device 1100 may have access to computer-readable storage media storing computer-executable instructions, which, when executed by the computing device 1100, may perform the methods described herein.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A system, comprising:
at least one processor; and
at least one memory communicatively coupled to the at least one processor and comprising instructions that upon execution by the at least one processor cause the system to perform operations comprising:
generating logical logs and log sequence numbers (LSNs) associated with the logical logs based on data captured by a first processing engine, the first processing engine configured to perform online transactional processing, wherein the LSNs comprises data definition language (DDL) LSNs associated with DDL operations;
propagating the logical logs and the LSNs to a storage, the storage configured to be in communication with the first processing engine and a second processing engine, the second processing engine configured to perform online analytical processing, wherein the storage is divided into a first part and a second part, and wherein the second part of the storage comprises partitions each of which comprises a delta store and a base store;
storing and distributing the LSNs by a metadata service, wherein the metadata service is configured to periodically pull DDL information from the first processing engine and identify a newest DDL LSN as a current metadata version; and
wherein the first processing engine, the second processing engine, the storage, and the metadata service are modularized, are configured to be decoupled from each other, and support the LSNs for maintaining data consistency across the system.

2. The system of claim 1, the operations further comprising:
applying a quorum protocol on replicas of a logical log in each partition of the storage, wherein the quorum protocol maintains data consistency between the replicas during a read and write process.

3. The system of claim 1, the operations further comprising:
applying a gossip protocol on replicas of a logical log in each partition of the storage, wherein the gossip protocol addresses temporary data inconsistencies between the replicas.

4. The system of claim 1, wherein a LSN is an integral and incremental number indicative of a storage state.

5. The system of claim 1, the operations further comprising:
assigning a read LSN to a query from the metadata service, wherein the read LSN corresponds to a LSN that each partition of the storage has been persisted up to a time of compiling the query.

6. The system of claim 5, the operations further comprising:
launching scan tasks for retrieving data from the partitions of the storage based on the read LSN.

7. The system of claim 1, the operations further comprising:
applying a plurality of LSNs indicative of states of a plurality of operations, wherein the plurality of LSNs enable the plurality of operations to work together in a concurrent and coherent manner, and wherein the plurality of operations comprises data scan, data insert, data delete, data flush, compaction, and garbage collecting.

8. The system of claim 7, wherein the plurality of LSNs comprise:
a threshold read LSN for concurrently performing a data scan and flushing data from the Delta Store to the Base Store in the storage, wherein only data with LSNs smaller than the threshold read LSN are flushed from the Delta Store to the Base Store, and wherein the threshold read LSN is a minimum read LSN of active queries;
a last flush LSN indicating a maximum LSN of a previous flush;
a next flush LSN indicating a maximum LSN of a next flush, the next flush LSN is selected between the min read LSN and the last flush LSN; and
a truncate LSN associated with an operation of removing old data from the storage, wherein only data with LSN smaller than the truncate LSN are removed from the storage.

9. The system of claim 1, further comprising:
a centralized compilation service configured to retrieve a read LSN for any particular query from the metadata service.

10. The system of claim 1, wherein the system provides a plurality of modes selectable by users, the plurality of modes corresponding to different levels of data consistency.

11. A method, comprising:
generating logical logs and log sequence numbers (LSNs) associated with the logical logs based on data captured by a first processing engine, the first processing engine configured to perform online transactional processing, wherein the LSNs comprises data definition language (DDL) LSNs associated with DDL operations;
propagating the logical logs and the LSNs to a storage, the storage configured to be in communication with the first processing engine and a second processing engine, the second processing engine configured to perform online analytical processing, wherein the storage is divided into a first part and a second part, and wherein the second part of the storage comprises partitions each of which comprises a delta store and a base store;
storing and distributing the LSNs by a metadata service, wherein the metadata service is configured to periodically pull DDL information from the first processing engine and identify a newest DDL LSN as a current metadata version; and
wherein the first processing engine, the second processing engine, the storage and the metadata service are modularized, are configured to be decoupled from each other, and support the LSNs for maintaining data consistency across the system.

12. The method of claim 11, further comprising:
applying a quorum protocol on replicas of a logical log in each partition of the storage, wherein the quorum protocol maintains data consistency between the replicas during a read and write process.

13. The method of claim 11, further comprising:
applying a gossip protocol on replicas of a logical log in each partition of the storage, wherein the gossip protocol addresses temporary data inconsistencies between the replicas.

14. The method of claim 11, wherein a LSN is an integral and incremental number indicative of a storage state.

15. The method of claim 11, further comprising:
assigning a read LSN to a query from the metadata service, wherein the read LSN corresponds to a LSN that each partition of the storage has been persisted up to a time of compiling the query.

16. The method of claim 15, further comprising:
launching scan tasks for retrieving data from the partitions of the storage based on the read LSN.

17. The method of claim 11, further comprising:
applying a plurality of LSNs indicative of states of a plurality of operations, wherein the plurality of LSNs enable the plurality of operations to work together in a concurrent and coherent manner, and wherein the plurality of operations comprises data scan, data insert, data delete, data flush, compaction, and garbage collecting.

18. The method of claim 17, wherein the plurality of LSNs comprise:
a threshold read LSN for concurrently performing a data scan and flushing data from the Delta Store to the Base Store in the storage, wherein only data with LSNs smaller than the threshold read LSN are flushed from the Delta Store to the Base Store, and wherein the threshold read LSN is a minimum read LSN of active queries;
a last flush LSN indicating a maximum LSN of a previous flush;
a next flush LSN indicating a maximum LSN of a next flush, the next flush LSN is selected between the min read LSN and the last flush LSN; and
a truncate LSN associated with an operation of removing old data from the storage, wherein only data with LSN smaller than the truncate LSN are removed from the storage.

19. The method of claim 11, further comprising:
providing a plurality of modes selectable by users, the plurality of modes corresponding to different levels of data consistency.

20. A non-transitory computer-readable storage medium, comprising computer-readable instructions that upon execution by a system cause the system to implement operations comprising:
- generating logical logs and log sequence numbers (LSNs) associated with the logical logs based on data captured by a first processing engine, the first processing engine configured to perform online transactional processing, wherein the LSNs comprises data definition language (DDL) LSNs associated with DDL operations;
- propagating the logical logs and the LSNs to a storage, the storage configured to be in communication with the first processing engine and a second processing engine, the second processing engine configured to perform online analytical processing, wherein the storage is divided into a first part and a second part, and wherein the second part of the storage comprises partitions each of which comprises a delta store and a base store;
- storing and distributing the LSNs by a metadata service, wherein the metadata service is configured to periodically pull DDL information from the first processing engine and identify a newest DDL LSN as a current metadata version; and
- wherein the first processing engine, the second processing engine, the storage and the metadata service are modularized, are configured to be decoupled from each other, and support the LSNs for maintaining data consistency across the system.

\* \* \* \* \*